United States Patent [19]
Cheng

[11] Patent Number: 6,157,390
[45] Date of Patent: Dec. 5, 2000

[54] STROKE-BASED FONT GENERATION

[75] Inventor: Kuo-Young Cheng, Taichung Hsien, Taiwan

[73] Assignee: Dynalab (S) Ltd., Singapore, Singapore

[21] Appl. No.: 08/717,172

[22] Filed: Sep. 20, 1996

[51] Int. Cl.[7] .................................................. G06T 11/00
[52] U.S. Cl. ............................................................ 345/467
[58] Field of Search ..................................... 345/467, 442

[56] References Cited

U.S. PATENT DOCUMENTS

| | | |
|---|---|---|
| 4,897,638 | 1/1990 | Kokunishi et al. . |
| 4,990,903 | 2/1991 | Cheng et al. . |
| 5,119,296 | 6/1992 | Zheng et al. . |
| 5,212,769 | 5/1993 | Pong . |
| 5,450,096 | 9/1995 | Yoshida et al. . |

*Primary Examiner*—Mark K. Zimmerman
*Assistant Examiner*—Huedung X. Cao
*Attorney, Agent, or Firm*—Christensen O'Connor Johnson Kindness PLLC

[57] ABSTRACT

A method and apparatus for producing a stroked-based font defined by a stroke representation displayable in high-resolution and low-resolution space. The stroke representation includes defining a basic stroke with key points and width values as its primary parameters and feature points and curve features as the secondary parameters. Hinting information for certain key points provide information for displaying quality strokes in low resolution space. A CAD tool allows a font designer to easily select the parameters for the design of basic strokes.

15 Claims, 29 Drawing Sheets

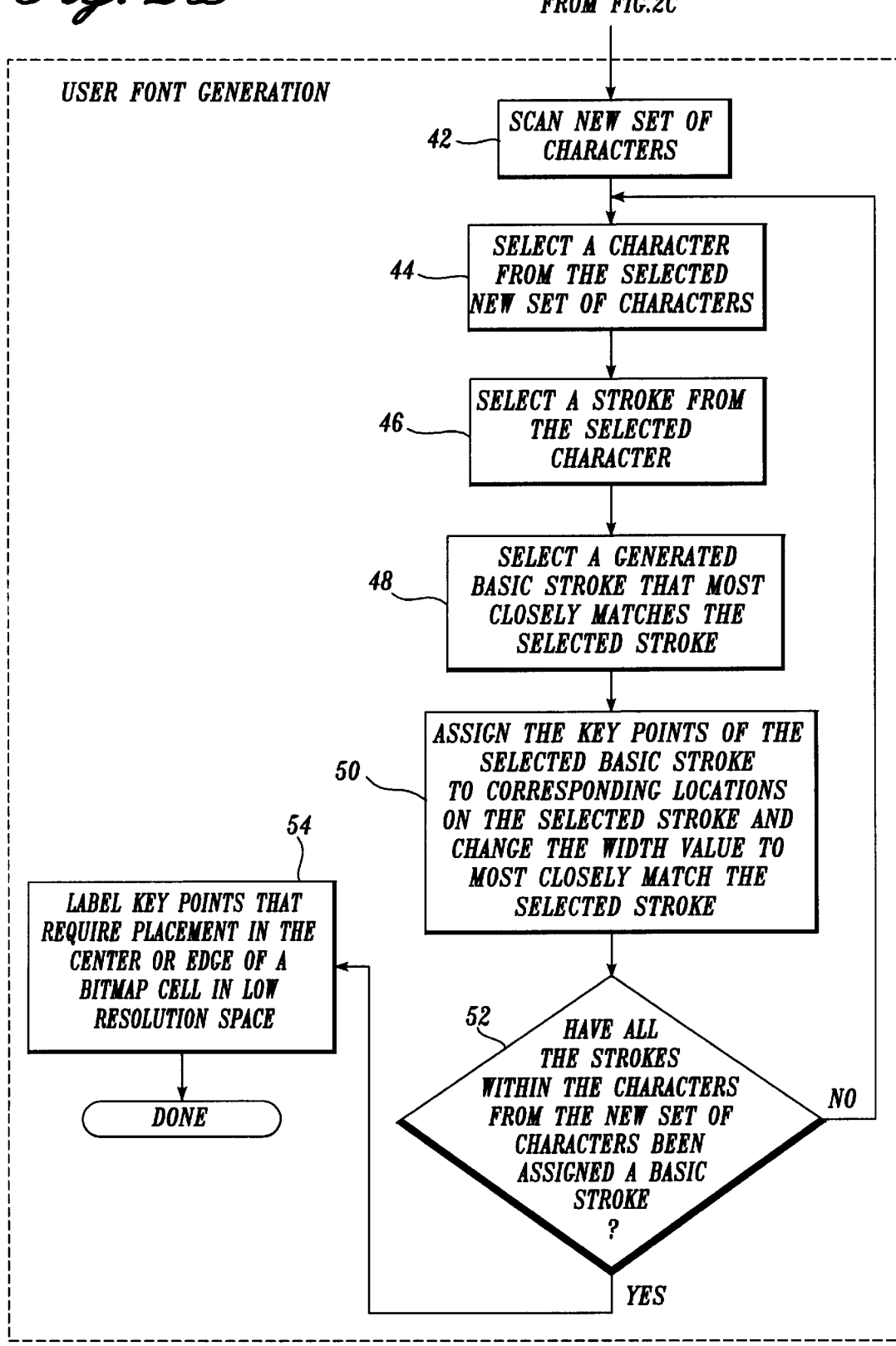

FONT ID 410, CHAR ID 43258

| STROKE CODES | WIDTH CODES | KEY-POINT LOCATIONS | 191 |
|---|---|---|---|
| 140 | 36, 20 | (11, 41)*, (243, 41) | |
| 12 | 18, 24 | (130, 41)*, (113, 245)*, (84, 224)* | |

| FEATURE POINTS CODES | POINTS CODES | REFERENCED RELATIVE POSITIONS | REFERENCED WIDTHS CODES |
|---|---|---|---|
| 0 | (0, 0) | (0.0, -3.0) | (7, 7) |
| 1 | (1, 1) | (-17.0, -20.0) | (0, 1) |
| 2 | (0, 0) | (4.0, 4.0) | (7, 7) |
| 3 | (1, 0) | (-28.0, -3.0) | (0, 7) |
| 4 | (1, 0) | (0.0, -1.0) | (0, 7) |
| 5 | (1, 1) | (0.0, 4.0) | (0, 7) |

| CURVE SEGMENT CODES | END POINTS (FEATURE POINTS CODES) | MID-CONTROL POINT RATIOS |
|---|---|---|
| 0 | (4, 5) | (0.0, -0.3) |
| 1 | (4, 1) | (-0.088, -0.078) |
| 2 | (0, 2) | (0.0, -0.214) |
| 3 | (3, 0) | (0.0, 0.0) |
| 4 | (1, 3) | (-0.045, -0.029) |
| 5 | (2, 5) | (0.0, 0.0) |

| AREAS 192 | VERTICES 193 | 195 | 194 |
|---|---|---|---|
| 0 | 1, 3, 0, 2, 5, 4 | | |

| FEATURE POINTS CODES | REFERENCED KEY POINTS | REFERENCED RELATIVE POSITIONS | REFERENCED WIDTHS CODES |
|---|---|---|---|
| 0 | (0, 0) | (-8.0, 0.0) | (0, 0) |
| 1 | (0, 0) | (9.0, 0.0) | (0, 0) |
| 2 | (0, 2) | (-8.0, -1.0) | (0, 1) |
| 3 | (0, 1) | (9.0, -24.0) | (0, 0) |
| 4 | (1, 1) | (-1.0, 0.0) | (0, 0) |
| 5 | (2, 2) | (0.0, -1.0) | (1, 1) |
| 6 | (2, 2) | (0.0, 4.0) | (1, 1) |

| CURVE SEGMENT CODES 196 | END POINTS (FEATURE POINTS CODES) 197 | MID-CONTROL POINT RATIOS 198 |
|---|---|---|
| 0 | (0, 1) | (-0.029, 0.0) |
| 1 | (0, 2) | (0.0, -0.002) |
| 2 | (1, 3) | (0.0, -0.002) |
| 3 | (3, 4) | (0.435, 0.375) |
| 4 | (5, 2) | (0.0, 0.0) |
| 5 | (5, 6) | (0.0, -0.1) |
| 6 | (6, 4) | (0.357, -0.447) |

| AREAS 199 | VERTICES 200 |
|---|---|
| 0 | 0, 2, 5, 6, 4, 3, 1 |

STROKE-BASED FONT GENERATION

FIELD OF THE INVENTION

The invention relates to the art of generating digital representations of typographic characters or other symbols and more particularly, methods and apparatus for generating a bitmap font of Asian characters or symbols for low and high-resolution devices.

BACKGROUND OF THE INVENTION

Many font generating systems exist for generating Asian character fonts, or simply Asian fonts. An Asian font is composed of a large number of ideographs that represent the characters in the Asian language. Asian languages may include thousands of characters. For example, the Chinese language includes over twenty-thousand distinct characters.

The following are various prior art Asian font generating techniques.

In one conventional computer technique, characters are stored as digitized bitmap images that are scanned from hand generated images of each Asian character in the particular font desired. As can be appreciated, this can be a time and labor intensive task. In addition, the memory space required for an Asian font stored as bitmap images is enormous. For example, if the resolution of each character is 256×256, then it takes 65,536 bits of memory per character (or 8192 bytes per character). Multiplied by 20,000 characters in the Chinese language, the amount of memory needed to store a single Asian font is over 1.3 Gbits of memory (or 150 Mbytes). The amount of memory required is unacceptable for many applications.

In another conventional technique, a method has been adopted wherein a character pattern stored in the form of linetone images is displayed or printed out. This method has long been used in the field of X-Y plotters. With this method, it is possible to enlarge or reduce a character size or to rotate a character pattern. However, there is a problem of character quality because the original character pattern is composed of linetone images.

Another prior art method for storing and generating character patterns that attempts to eliminate the above disadvantages is known as the outline font system. This system is described in "PostScript Language Tutorial and Cookbook" by Adobe Systems, Inc. (Addison-Wesley Publishing, 1985). In this method, the outline of a character pattern is stored as a collection of straight lines and curves and a conversion such as for enlargement, reduction, rotation, scaling a conversion is carried out at the time of outputting a character pattern. Since the outline of a character pattern is stored graphically, the conversion can be easily carried out. In addition, it is possible to store an original character pattern in the form of an outline with high quality and with relatively low memory requirements.

Another method of generating character patterns uses character pattern data. The character pattern data of this stroke-based technique includes skeleton pattern data, stroke thickness data and shape parameter data. See U.S. Pat. No. 4,897,638. Another stroke-based technique defines characters with strokes defined by height, width and curvature points. See U.S. Pat. No. 4,990,903. These stroke-based techniques are good for generating characters in a relatively high resolution character space, such as a 256×256 bitmap but are inadequate for generating characters in a relatively low resolution character space, such as a 24×24 bitmap. The character space is the presentation area for an individual character. The resolution level for the character space is most often determined by display or printer requirements.

With great frequency, features of stroke shapes will not fall directly on available pixels but, instead, fall between pixels. Consequently, due to the coarseness of the display resolution, it may not be possible to display the precise features, thereby losing the feature entirely or at least somewhat altering its shape. For example, the mapping strategy of the '903 patent produces a bitmap font in a 24×24 dot matrix pattern as shown in FIG. 1B. This mapping strategy activates a pixel, if it contains a piece of the generated stroke area, as shown by the outline. This mapping strategy avoids the drop out of a stroke shape, but widens the stroke shapes with undesirable pixels. Consequently, the display is jammed with activated pixels which produces an unacceptable low resolution bitmap character. Therefore, the method is optimized for generating a high-resolution font, but is not very suitable for yielding a good quality low-resolution font. Furthermore, these techniques fail to provide an interface for designers and users for easily creating desired character sets.

SUMMARY OF THE INVENTION

In accordance with this invention, a method and apparatus for generating a font of an Asian language is provided, said Asian language including a set of characters. The method includes the step of generating a set of basic strokes based upon observing the set of characters. Each basic stroke in the set of basic strokes is representative of a set of similar strokes used in the set of characters. Each basic stroke is identified by a plurality of key points and at least one width value. The method also includes the step of using the set of basic strokes to build stroke by stroke each of the characters in the set of characters by, for each stroke in each character, identifying the basic stroke in the set of basic stroke that most closely approximates the stroke, formulating a modified basic stroke having modified key points and modified width values by manipulating the basic stroke via the key points and width values to match the stroke, storing the modified key points and modified width values in a memory, and repeating steps of building the strokes of the characters for each stroke of each character until all of the characters are represented by a plurality of modified basic strokes.

In accordance with other aspects of this invention, the method includes the steps of selecting a character for display on the display device and retrieving predefined, prestored strokes that are associated with the selected character, wherein each stroke includes a predefined location and predefined, prestored key points, width values, curve values, and feature points. The feature points have a predefined spatial relationship to the key points. A key point is labeled with hint information, if the key point requires a predetermined specific display location. A bitmap image of the selected character is generated according to the retrieved strokes, wherein the generation of the bitmap image comprises placing the labeled key points of the retrieved strokes in the center of the bitmap cell that contains the labeled key point.

In accordance with other aspects of this invention, the method further includes the steps of calculating feature points according to the predefined spatial relationship with the placed labeled key points and the unlabeled key points, calculated curve segments between consecutive generated feature points according to the curve values, calculating outlines for strokes by connecting the generated curve segments, and filling the area contained within the calculated stroke outlines, wherein a pixel is activated, if at least half of the pixel is covered by the area within the generated stroke outline or the center of a pixel is located within the outline of a stroke.

In accordance with further aspects of this invention, the step of generating curve segments between consecutive generated feature points according to the curve values further includes the steps of defining at least one midcontrol point existing between two consecutive feature points and generating the curve segments using Bezier triangle curve generation according to the defined at least one midcontrol point and the corresponding feature points.

As will be readily appreciated from the foregoing summary, the invention provides a new and improved method and apparatus for generating a bitmap font of Asian characters for low and high-resolution space.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 2B–2D are flow diagrams of the method for the construction of a stroke-based font in accordance with the claimed invention;

FIGS. 3A–3D are example screen shots of the CAD tool used for identifying primary parameters of a basic stroke;

FIGS. 4A–4J are screen shots of a designer CAD tool used for creating strokes of a particular font style;

FIGS. 6A–6E are screen shots of a user CAD tool used for creating a stroke-based font with the strokes created by the designer CAD tool;

FIG. 8 is an illustration showing the primary font data of a character; and

DETAILED DESCRIPTION OF THE PREFERRED EMBODIMENT

Figure 1A:
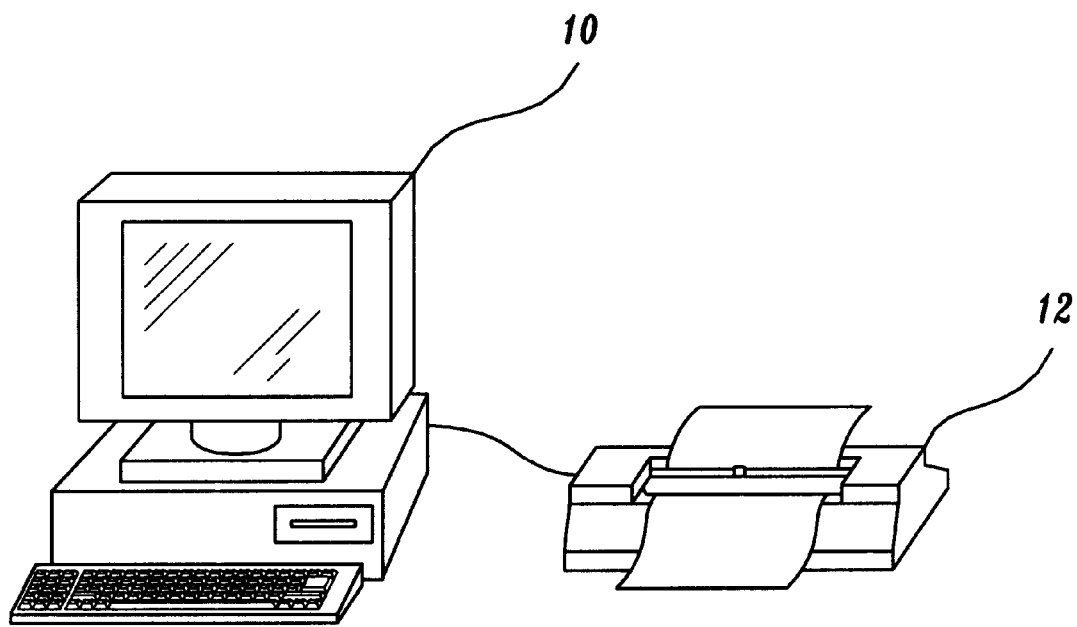
FIG. 1A is a drawing of a general purpose computer and printer for executing the methods of the present invention.
Figure 1B:
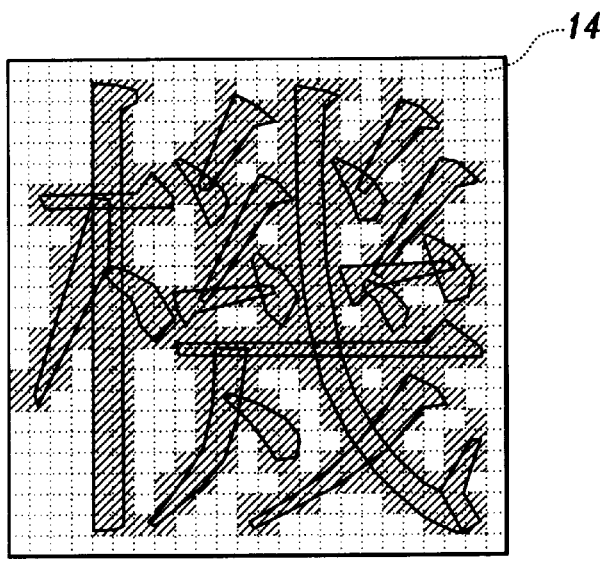
FIG. 1B is a high resolution stroke-based character displayed in a low resolution space in accordance with the prior art.

FIG. 1A is a display of a general purpose digital computer 10 with an attached printing device 12, which when loaded with a windowing type of software operating system, such as Windows 95™, is fully capable of performing the method of the present invention. The printing device 12 and the display of the digital computer 10 may print and display in either low (e.g. dot matrix) or high (e.g. laser) resolution quality. Other type of computing systems, such as networked or mainframe-based systems, are compatible with the present invention provided the system includes a compatible window-type operating system.

Figure 1C:
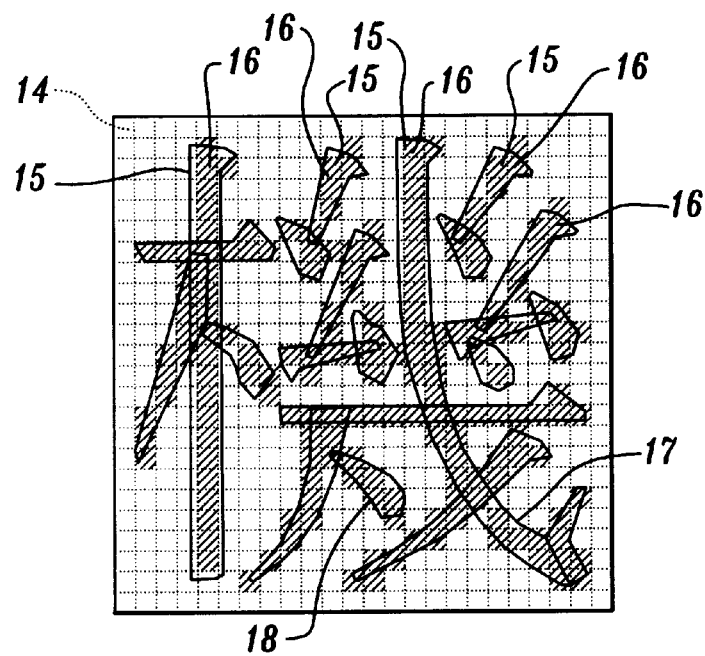
FIG. 1C is a high resolution stroke-based character generated in accordance with the present invention and displayed in low resolution space.

The preferred embodiment of the present invention yields high quality strokes that make up characters of a font in a low resolution character display area (bitmap). An example of a character displayed in a low resolution character display area (24×24 character space (bitmap) 14) is shown in FIG. 1C. A font is defined as a set of characters (in this case Asian language characters) with a similar style.

A second embodiment of the present invention provides a system for defining a database including a reduced set of "basic strokes" for purchase and use by a graphics designer (user). Each basic stroke in the database represents one or more similar strokes used to formulate characters.

A third embodiment of the present invention provides a system for creating a stored set of characters from the defined database of basic strokes. A basic stroke is at least one single brush stroke within a character. For example, stroke 17 of FIG. 1C includes three brush strokes, as shown by the three connected outlined shapes, and stroke 18 is an example of a stroke with only one brush stroke. The highlighted pixel cells 16 represent the actual display of a character created from a predefined database of strokes. The highlighted pixel cells 16 correspond as nearly as possible to their analog forms or outlines 15.

Figure 2A:
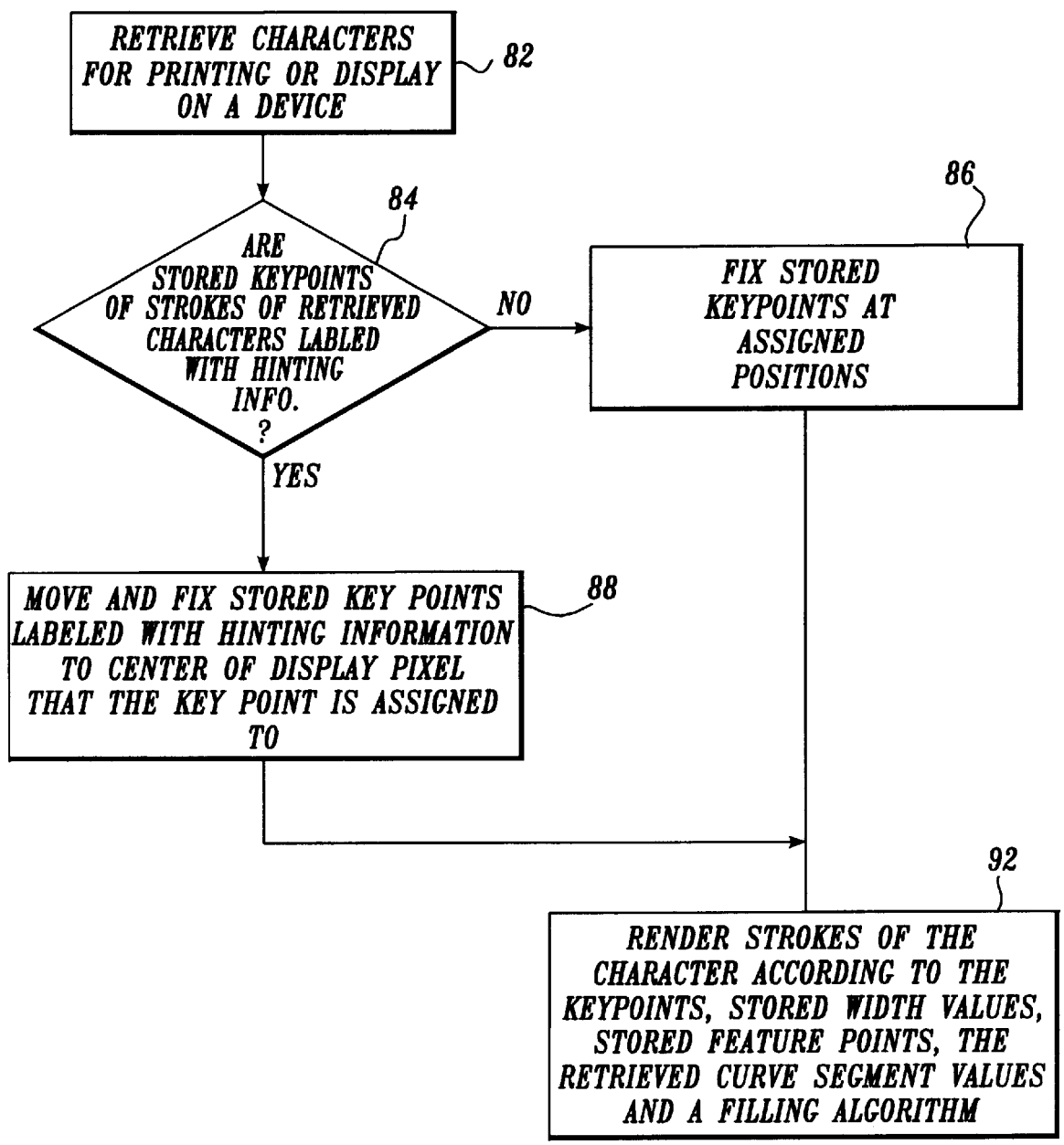
FIG. 2A is a flow diagram of the method for rendering characters for high and low resolution devices.

FIG. 2A illustrates the method for rendering characters in accordance with the preferred embodiment of the present invention. The steps shown in FIG. 2A are the steps performed by an image rendering program/engine in a computer for display on a low or high resolution display device or for printing on a low or high resolution printer. In block 82, one retrieves characters for printing or display on a designated printing or display device by selecting the characters from an application program; for example, an author creating a document in a word processing program.

At decision block 84, the system determines if stored reference points (key points) for the strokes of the retrieved characters are labeled with hinting information. Hint information is prestored according to observed stroke qualities in low resolution character space. If the key points are not labeled with hint information, the system fixes the key points at their stored position in the character space, at block 86.

However, if the key points are labeled, the labeled key points are moved and fixed to the center of the display pixel that the keypoints are addressed to, at block 88. Fixing is a step performed by the processor of the computer for recording the character space position, newly moved position or not, of the key point. Finally at block 92, the strokes are rendered according to the fixed key points, prestored width values, prestored feature points that identify points of the outline of the strokes, prestored curve values that define the lines between the feature points of the strokes, and a filling algorithm for activating pixels in accordance with a predefined method.

Figure 2B:
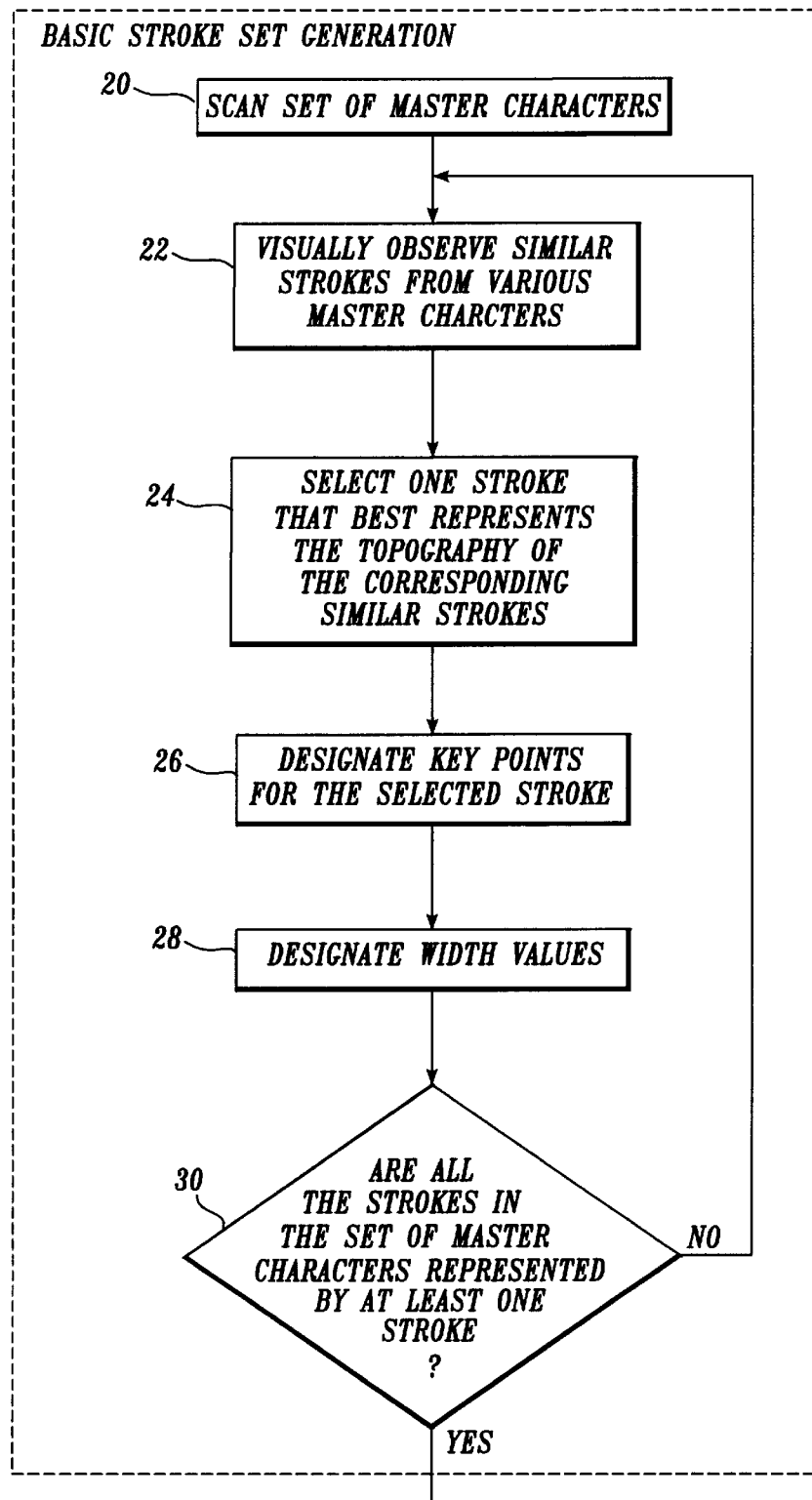
Figure 2C:
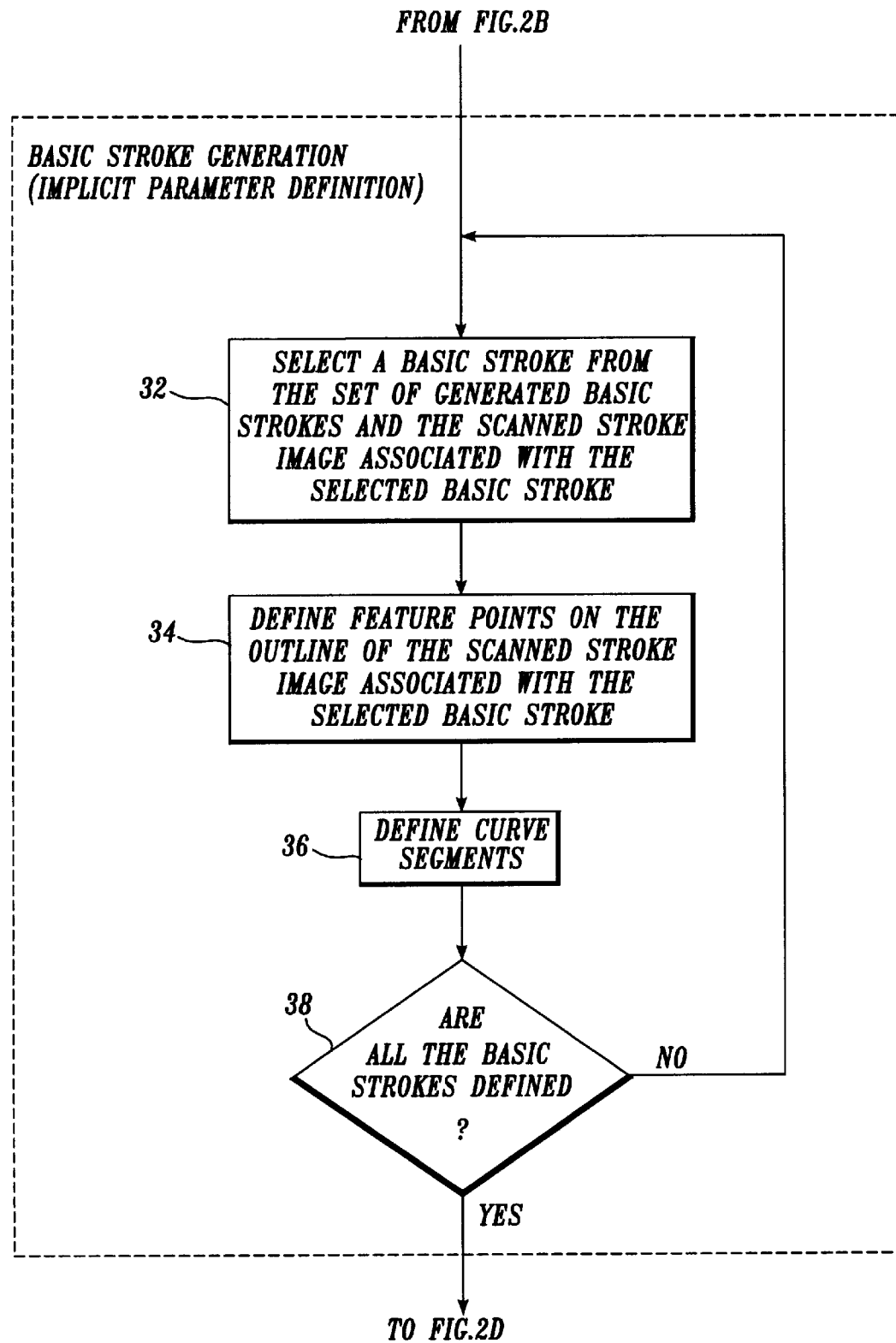

FIGS. 2B–2D are flow diagrams that illustrate the methods performed by the second and third embodiments of the present invention. The methods of FIGS. 2B–2D produce font data for high and low resolution character spaces. The steps shown in FIG. 2B illustrate the process for generating the primary parameters of a basic stroke. A set of basic strokes are a reduced set of strokes that represent, in a topography manner, all the strokes in a desired set of master characters. In the first step, at block 20, a font designer scans in or generates through the use of a graphics program a set of master characters. Other techniques may be used, provided that a set of master character images or outlines is usable as a template. The set of master characters are of the same font. If the master characters are Chinese characters, the following are examples of different Chinese character fonts a designer may choose from to form the set of master characters: text hand; running hand; cursive hand; seal type; Sung type; and Ming type.

The font designer then observes a group of similar strokes from the set of master characters, at block 22. The step of observing is as simple as visually scanning, manually or automatically by image analysis techniques, the set of master characters for strokes with similar topography. The font designer then selects a stroke to represent a group of strokes that have a similar topography, at block 24. It can be appreciated that the step of generating a basic stroke to represent a group of strokes is as much art as it is logic. It is up to the font designer's skill in knowing all of the characters in the language and determining whether or not a basic stroke is appropriate for a set of similar strokes.

Each selected basic stroke is designated as a basic stroke by first storing the primary parameters for a basic stroke. At block 26, the font designer identifies key points in a position relative to the topographic layout of the selected stroke. The font designer decides, based on stroke topography, size, vertical and horizontal portions and the observed similar strokes, where to place key points. Key points designation is described in more detail below with FIGS. 3A and 3B. Generally speaking however, key points are placed at the beginning and terminus of a stroke and at any location where a stroke changes direction abruptly. Moreover, key points should be placed wherever is necessary to "push or pull" segments of the basic stroke in order to match any of the set of similar strokes of which the basic stroke represents. In other words, the basic stroke must be able to be manipulated in order to form any of the strokes the basic stroke represents.

Next, in block 28, the font designer designates at least one width value for each stroke. The value of the widths chosen is a font designer determination based on observed widths of the observed similar strokes. Width value entry is described in more detail below with FIGS. 3C and 3D.

The font designer continues storing primary parameter values for basic strokes until all of the strokes in the set of master characters have a topological layout similar to at least one of the stored basic strokes. This is accomplished by decision block 30. It can be appreciated by one of ordinary skill in the art that the basic stroke storing steps described above could be performed manually or automatically with image analysis software identifying similar strokes and optimum locations for key points and values for widths of the similarly identified strokes.

FIG. 2C illustrates the steps required for assigning secondary parameters for the basic strokes, thus completing basic stroke creation. In secondary parameter assignment, a font designer selects a basic stroke with its outline image from the set of generated basic strokes, at block 32. The outlined image of the selected basic stroke is retrieved as a template for secondary parameter designation. The font designer defines feature points using the outlined image of the basic stroke, the key points and width values, at block 34, and then defines curve segments between pairs of defined features points, at block 36. The feature points are placed on the outline of the basic stroke at locations where the outline changes in direction or curvature.

Once all the basic strokes are fully defined by secondary parameters, the basic stroke definition is complete, see decision block 38. Basic stroke definition can also be performed automatically, using similar techniques used for automatic basic stroke set generation described above. Basic stroke creation is described in more detail below with the designer CAD tools of FIGS. 4A–4J.

FIG. 2D illustrates the steps performed by a user for generating a user font according to the created basic stroke with its secondary and primary parameters. A user is typically a graphic designer attempting to create a stored font database for commercial use. The user first scans a new set of characters in the font desired to use as a template for creating the user font at block 42. The new set of characters is a set of characters the user wishes to store in reduced space for a low or high resolution display. The user then selects a character from the scanned set of characters and a stroke from the selected character, at blocks 44 and 46. The user retrieves, from a list of created basic strokes, a basic stroke that most closely matches the selected stroke, at block 48. The shape of the selected basic stroke is then matched to the shape of the selected stroke by moving the key points of the selected basic stroke, thus moving the outline of the basic stroke to correspond to the outline of the selected stroke and changing the width value(s) of the basic stroke to match the width of the selected stroke, at block 50. The matching basic stroke is stored for representing the selected stroke during display processing. The steps of selecting and matching basic strokes to strokes within characters of the scanned new set of characters is performed until all the strokes within all the characters have a stored matched basic stroke, at decision block 52. The strokes that match strokes of the new set of characters and their key points are observed in low resolution character space. If observed strokes require specific placement within the character space in order to avoid poor display quality, the key points of these strokes are labeled with hint information for future display processing, at block 54. The step performed in block 54 may be performed by the font designer during the feature point and curve segment generation. The user font generation method is described in more detail below with the user CAD tools of FIGS. 6A–6E.

Basic Stroke CAD Tool

Figure 3A:
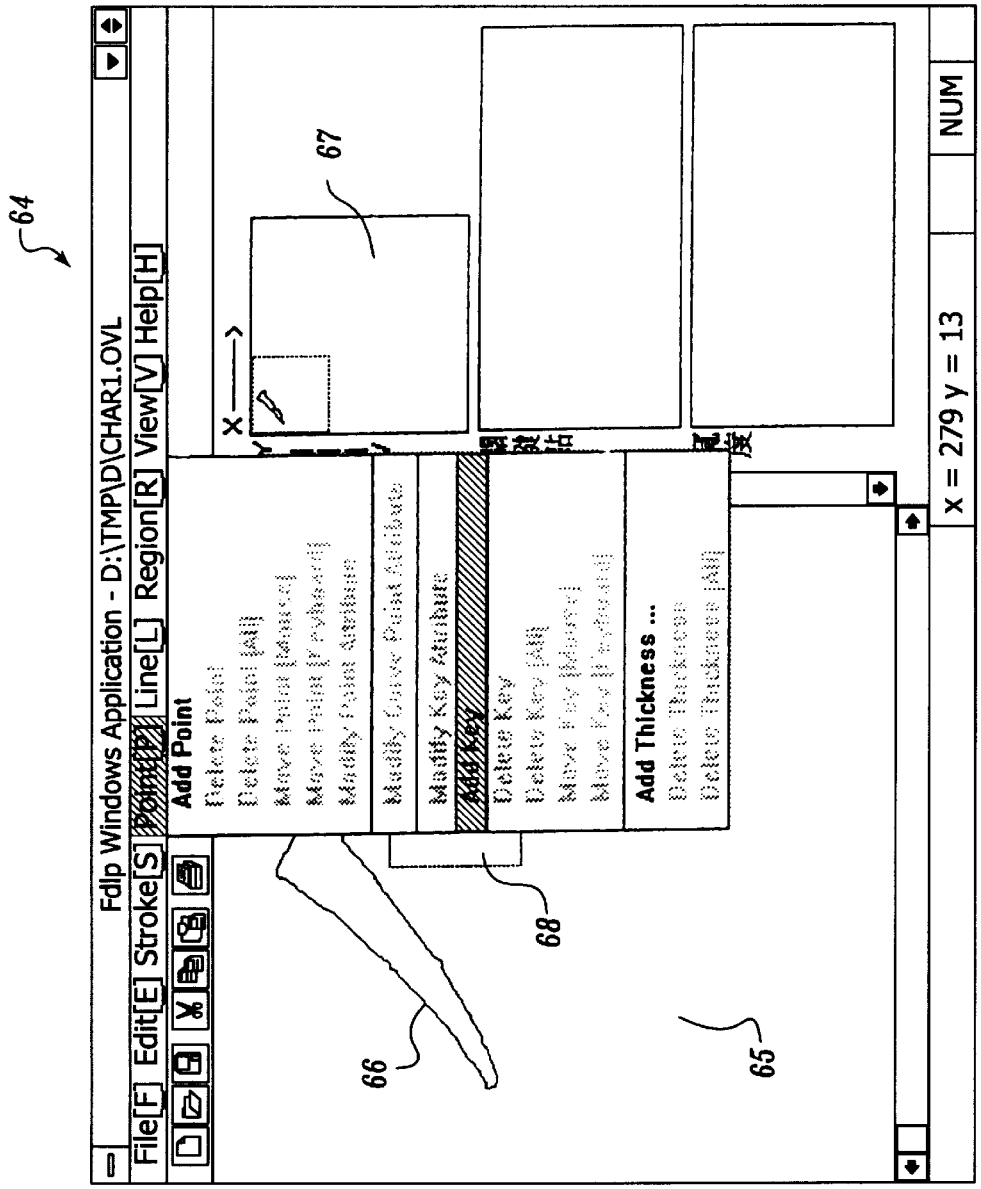

FIGS. 3A–3D illustrate primary parameter designation within a basic stroke CAD tool 64. As shown in FIG. 3A, the font designer retrieves an outline image 66 of a stroke retrieved from a set of scanned master characters. Outline image 66 is a stroke the font designer believes best represents a set of similar strokes from the observed set of master characters. The font designer begins primary parameter designation by selecting Add Key command 68 from the main menu of the CAD tool 64. Selection of the Add Key command 68 allows a font designer to place a first key point 70 at one end of outline image 66 within interactive windows 65. The CAD tool 64 is a window graphical user interface (GUI) with a title, main menu and button and a work space below the CAD tool bars with two 2-dimensional display areas 65 and 67. Display area 67 is located to the right side of the work space and is a character space that displays the retrieved outline image 66. The retrieved outline image 66 is displayed within a smaller block inside display area 67. Display area 65, located to the left of display area 67, is a larger view of the small box within display area 67. The font designer interfaces with the retrieved outline image 66 within display area 65. The retrieved outline image 66 is used as a template for defining the primary and secondary parameters of the basic stroke.

Figure 3B:
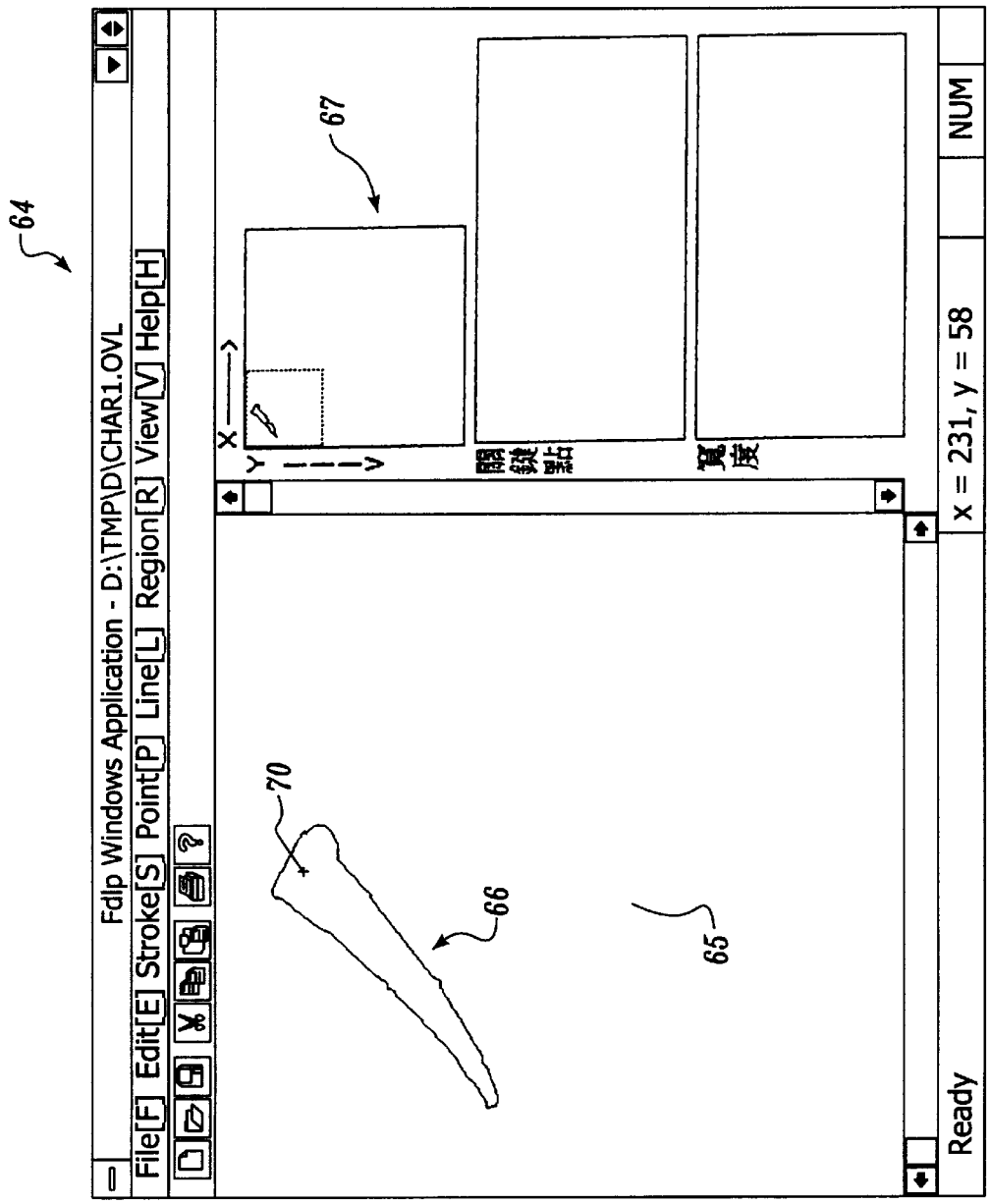

The font designer places a key point within display area 65 by activating or clicking a cursor device, such as a mouse, at a desired point. The font designer can place a key point either on, inside or outside of the outline of the retrieved outline image 66. Key point position depends on a number of observed features of the similar strokes from the set of master characters. It is preferable to place a key point at each end of the basic stroke. If the basic stroke is primarily a vertical stroke, the font designer places the key points horizontally in the middle of the width of the respective end. The opposite is true for primarily horizontal basic strokes. If a basic stroke includes a horizontal and a vertical portion joined at a joint, the font designer places a key point horizontally in the middle of the vertical portion's width and vertically in the middle of the horizontal portion's width. Essentially, key points are positioned to allow elongating, stretching or warping of a basic stroke's ends or other sections in order to match the observed similar strokes. Thus, key point placement depends upon font designer discretion. As shown in FIG. 3B, the font designer has placed a key point 70 within the outline of the outline image 66 at the fat end of the retrieved stroke 66. The minimum number of key points for a stroke is two.

Next, the font designer designates at least one width value for basic stroke. Again, it is up to the artistry of the font designer to designate those locations on the basic stroke that will require a width value. In general, width values should be located in those places of the stroke that need to be modified in order to adjust the basic stroke to fit any of the strokes in the set of strokes the basic stroke is to represent.

Figure 3D:
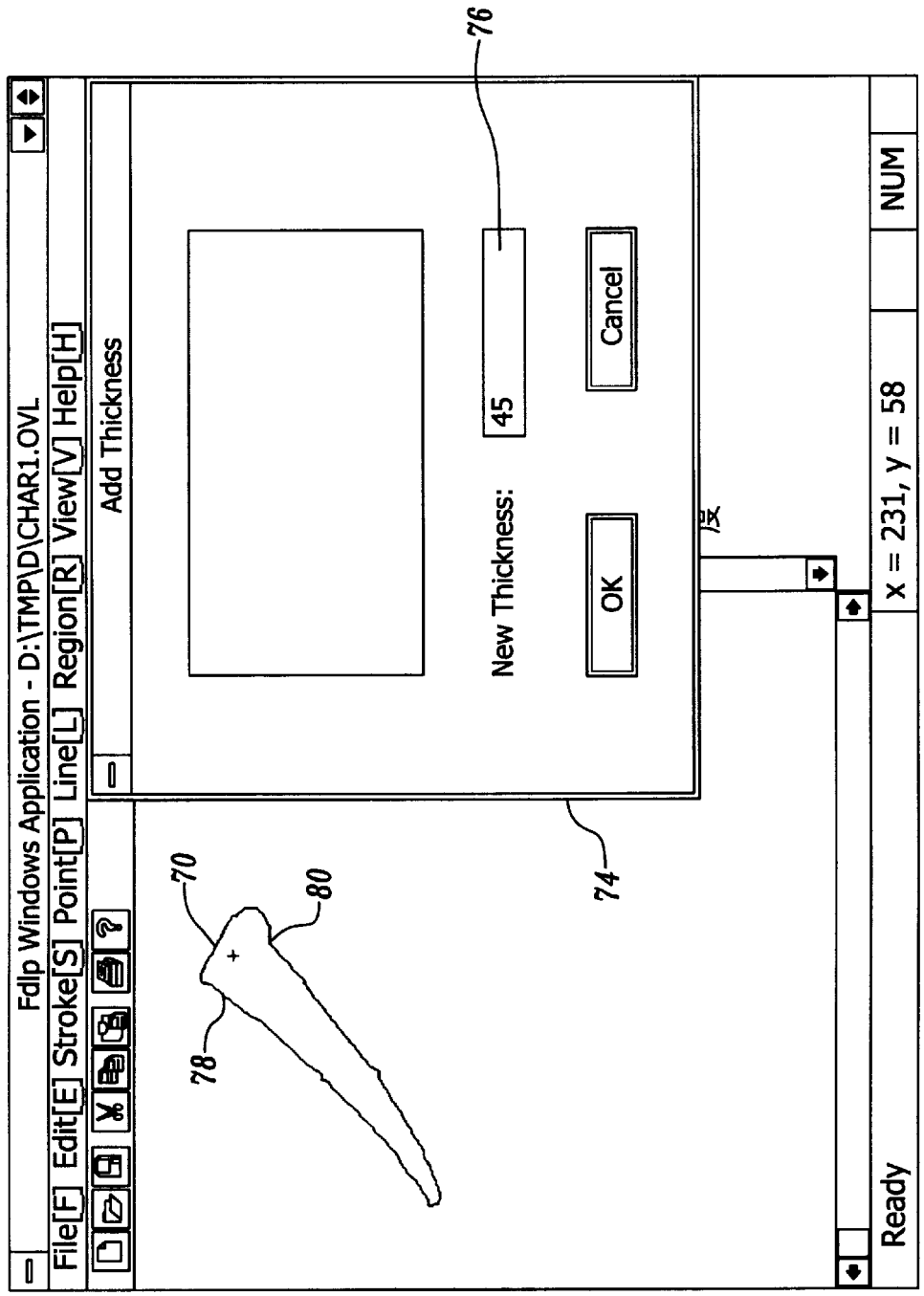

As shown in FIG. 3C, the font designer selects an Add Thickness command 72 to retrieve Add Thickness window 74, shown in FIG. 3D. Within Add Thickness window 74 the font designer designates a width value within new thickness box 76. The width value entered in new thickness block 76 is entered by the font designer designating a first and second point 78 and 80 on the outline of the stroke 66. The width value is obtained by measuring the straight-line distance between first and second points 78 and 80. The font designer determines the points on the outline by observing the widths of the observed similar strokes.

Figure 4A:
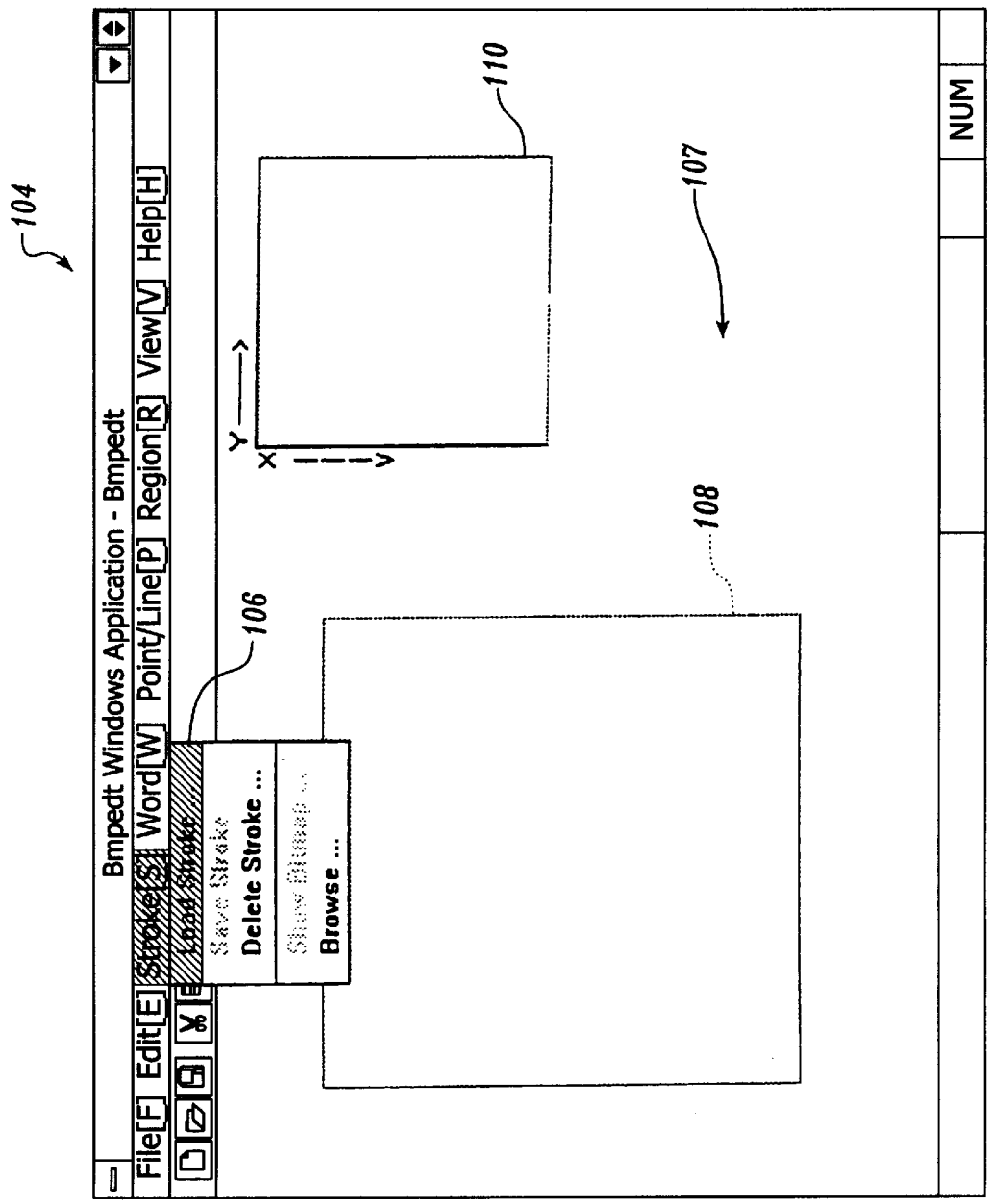
Figure 4B:
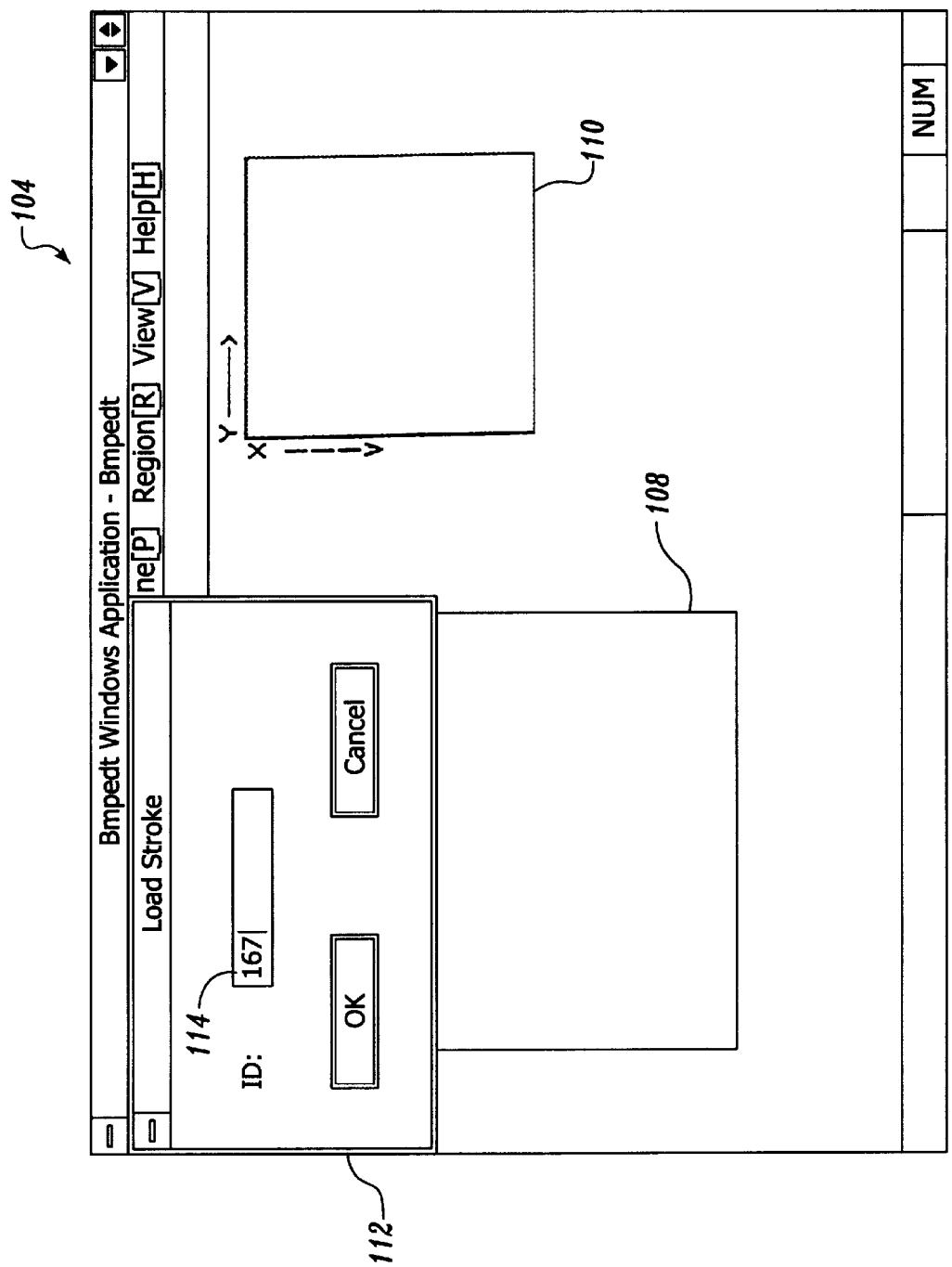

The basic stroke is complete after determining the secondary parameters: feature points and curve segments. FIGS. 4A–4J illustrate a basic stroke CAD tool used by a font designer for designating the secondary parameters of the basic stroke. The font designer begins by retrieving a basic stroke. The font designer selects a Load Stroke command 106 from the menu bar of the CAD tool 104, as shown in FIG. 4A, that retrieves basic stroke ID window 112, as shown in FIG. 4B. Each basic stroke is prestored with an assigned code. The font designer enters the code of a basic stroke into a field block 114 within ID window 112 in order to retrieve the basic stroke assigned to the entered code. The system displays the retrieved basic stroke in two 2-dimensional coordinate spaces. The first coordinate space 108 is a graphically interactive area and the second coordinate space 110 is a smaller noninteractive area The second coordinate space 110 may be used to display the retrieved stroke at various resolutions. Both coordinate spaces are displayed in a CAD workspace 107 located below the CAD tool's GUI bars. The retrieved basic stroke is displayed in the two coordinate spaces 108 and 110, and the associated code 117 and assigned width values 115 of the displayed stroke key point are displayed in the workspace 107, as shown in FIG. 4C.

As shown in FIG. 4C, the font designer enters a feature point by first selecting Add Point command 116 from the menu bar of the CAD tool 104. Feature point window 118 appears over a portion of the CAD tool 104. Using a cursor controlling device, such as a mouse, the font designer designates, in the first coordinate space 108, a feature point on the outline of the displayed basic stroke. The font designer places feature points at points on the outline where the outline creates a distinct angle, or similar significant change in direction, and at either end of a curve segment with a substantially constant radius.

The coordinate values for the designated feature point are displayed within feature point window 118 in feature point coordinate boxes 124*b* for the X coordinate value and 124*c* for the Y coordinate value. The font designer then enters at least one code of a key point. This associates the feature point to a key point. This is done at two sets of two key point field code boxes 126, one set for X and one for Y coordinates.

The font designer also enters two codes of a width value(s) in width field code window 128. One entered width value code is for the X coordinate and the other width value is for the Y coordinate. The entered codes are referred to as referenced values.

The system retrieves one of a number, n, of predefined formulas according to the entered referenced key point(s) and width value combination. The retrieved formula calculates referenced relative X and Y positions of the designated feature point. The referenced relative X and Y positions are stored for later use by a display processor for calculating feature point positions by applying the retrieved formula in the reverse direction.

Figure 4E:
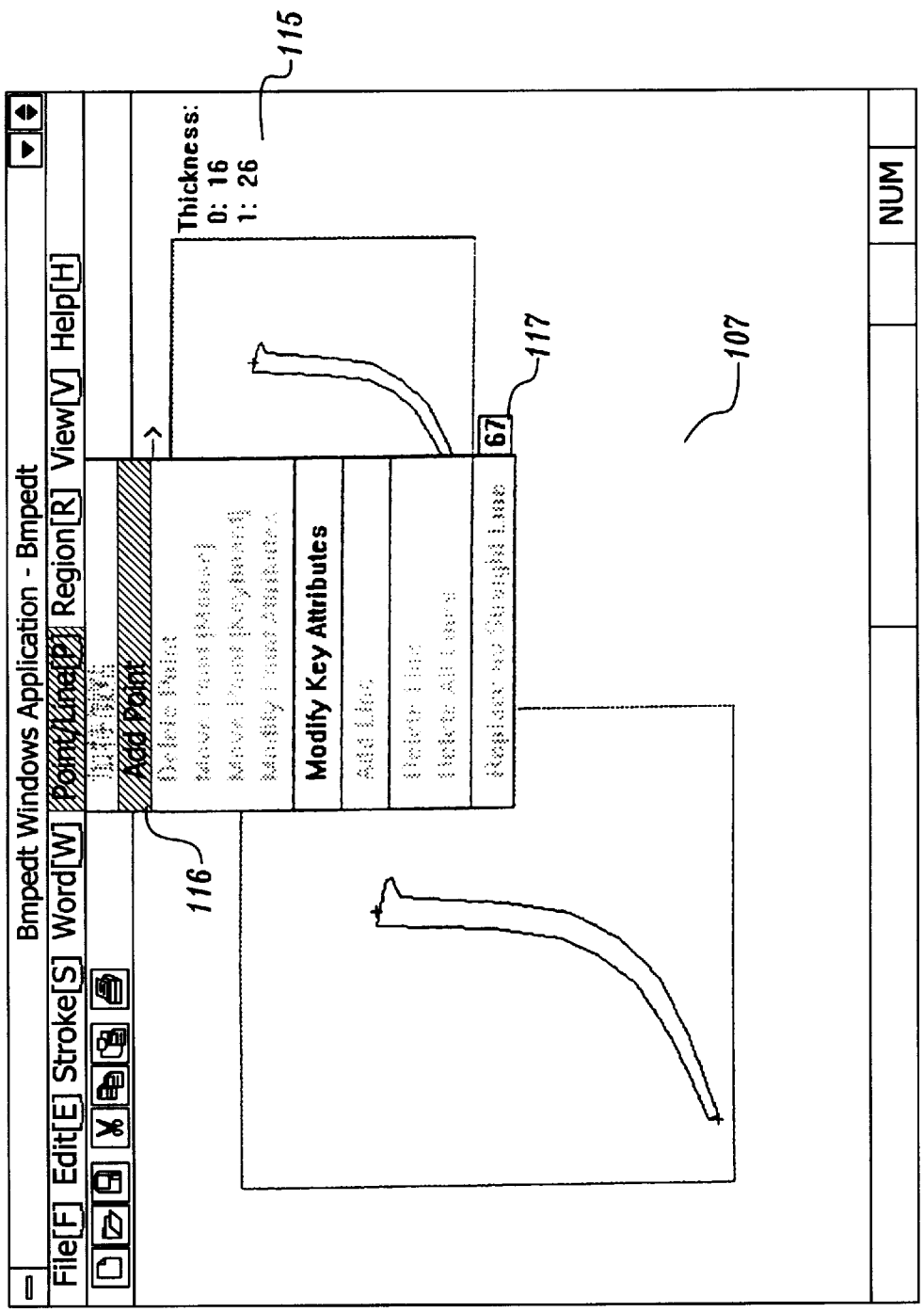
Figure 4D:
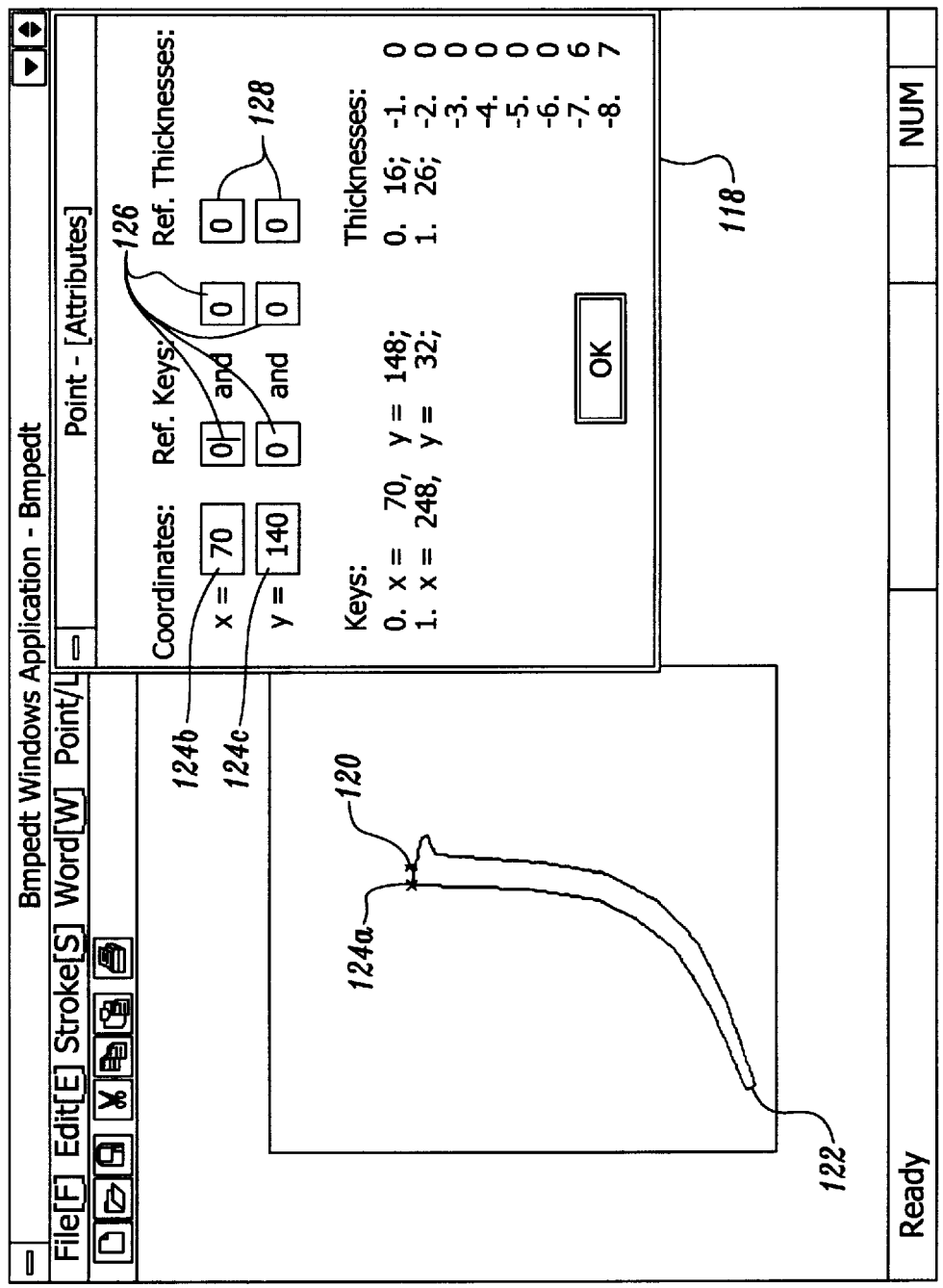
Figure 4E:
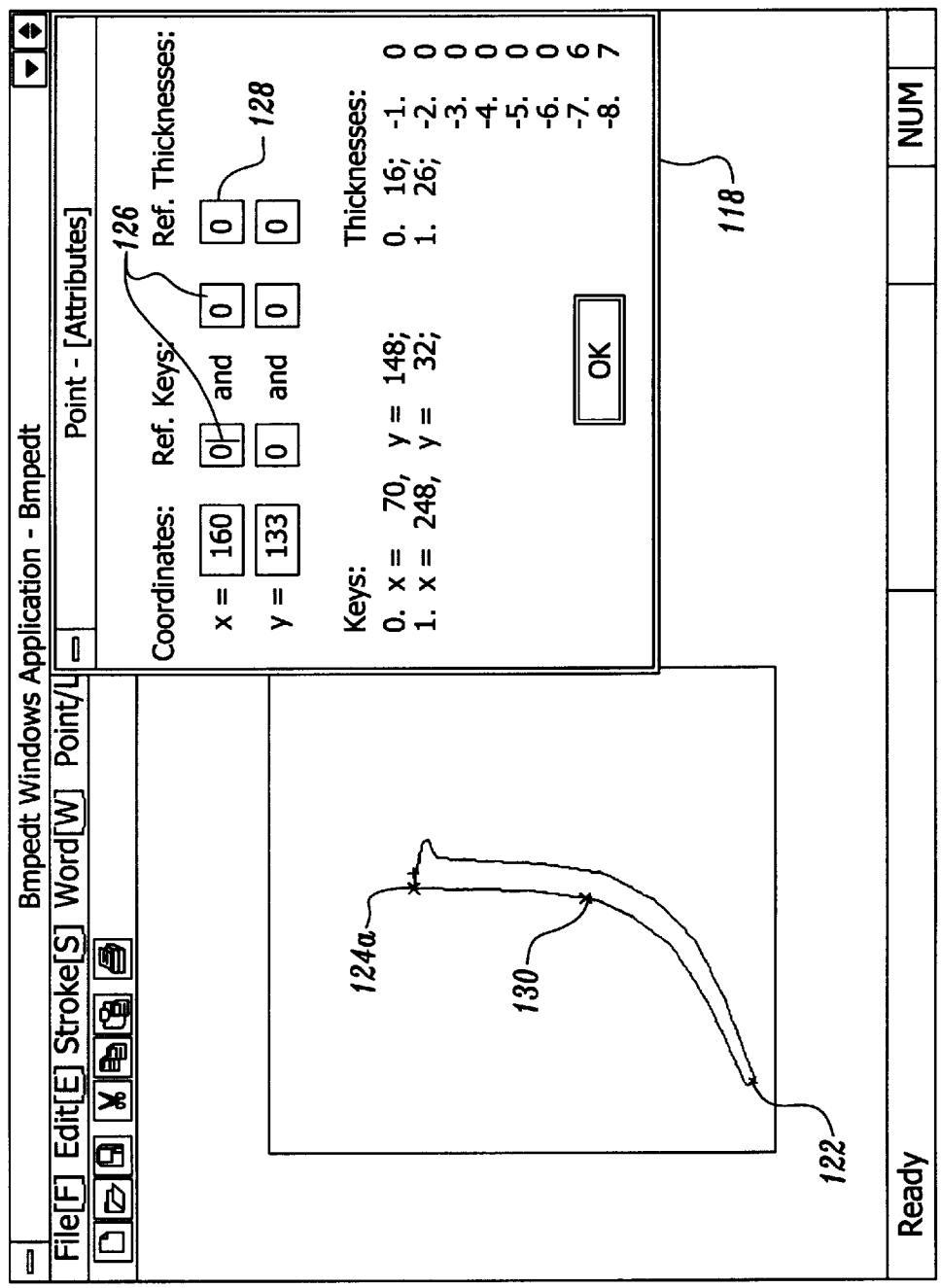
Figure 43:
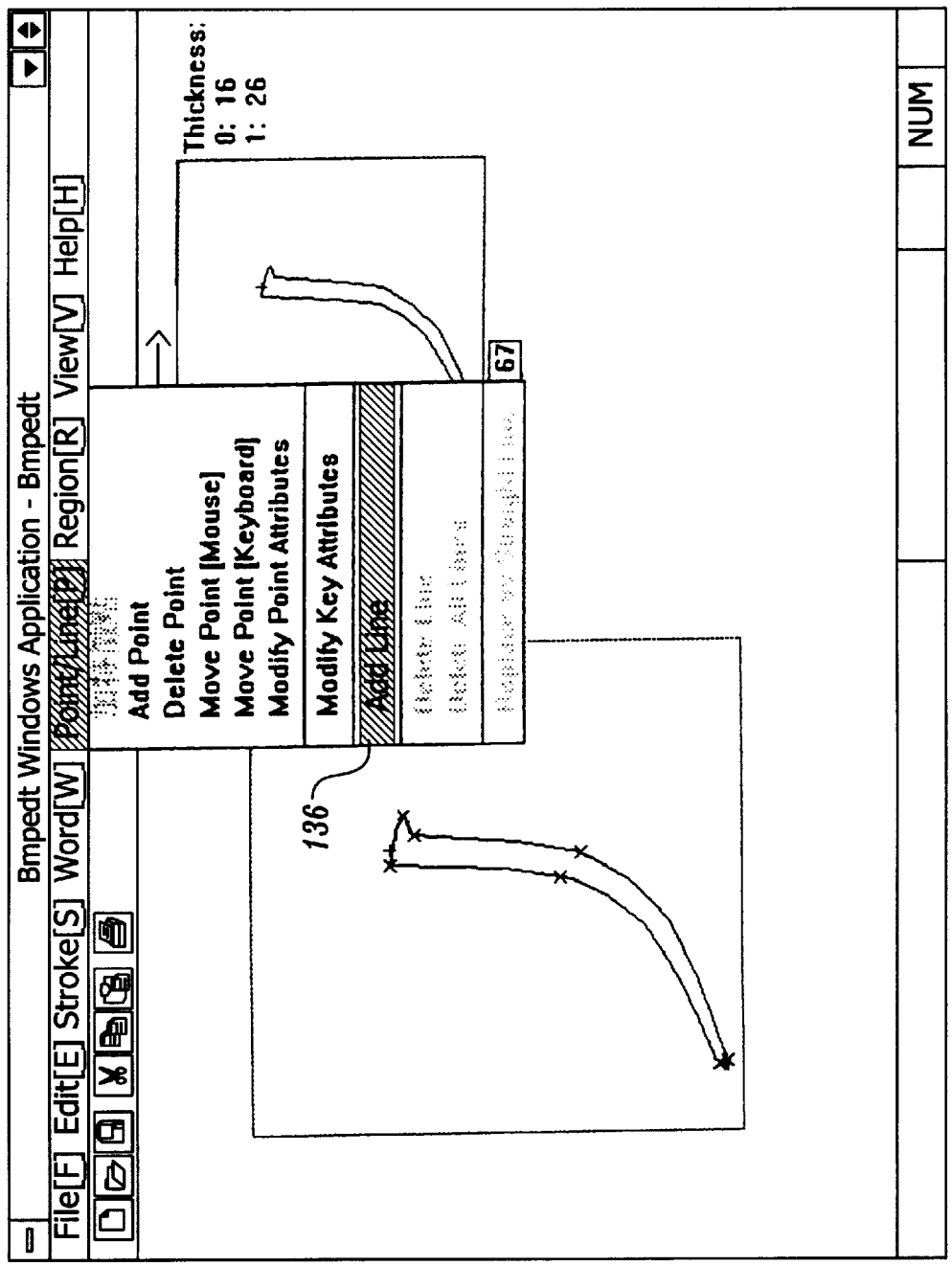
Figure 49:
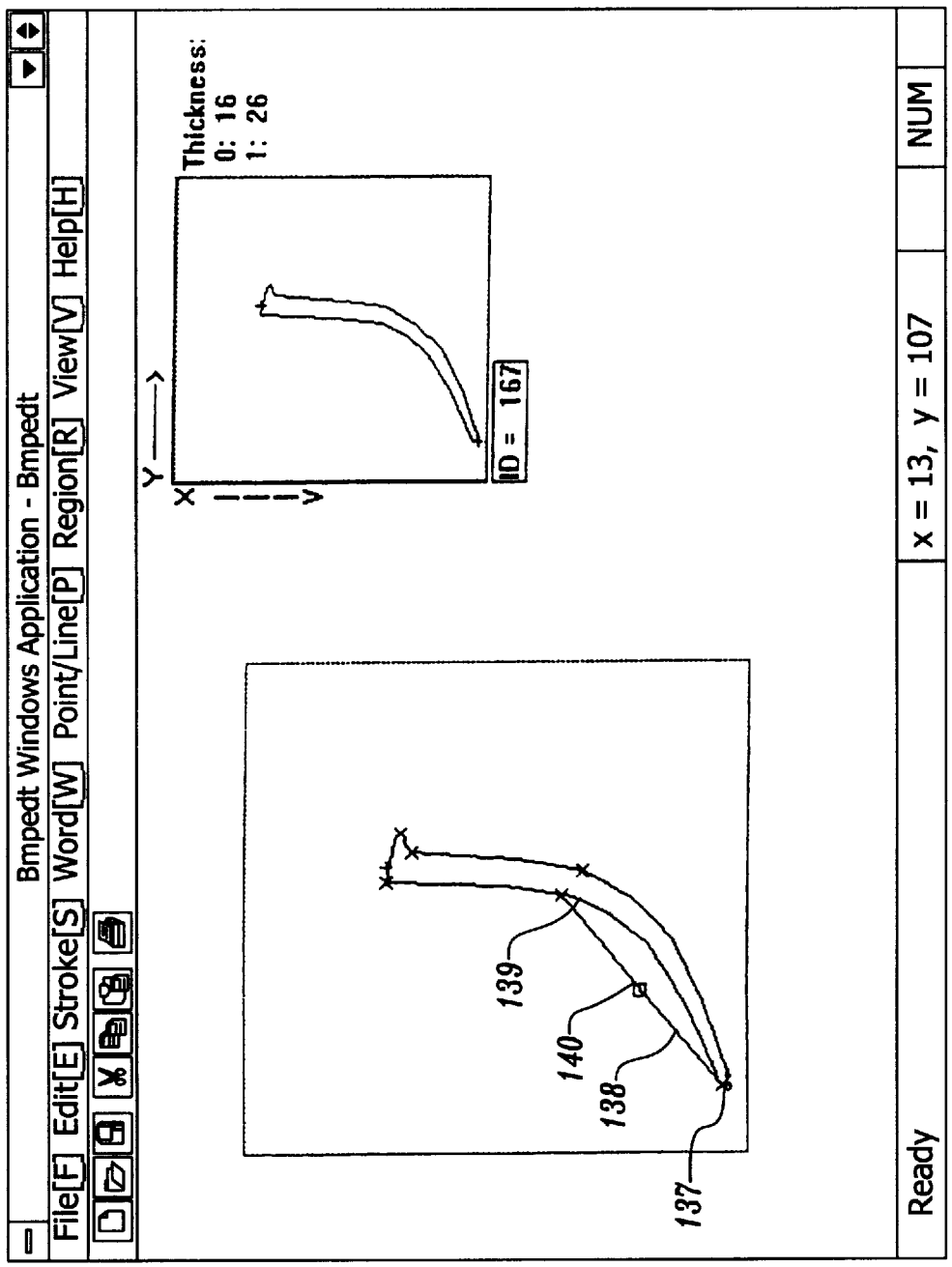

In the example of FIG. 4D, the font designer designated a feature point 124*a* on the outline of the stroke near key point 120 (code 0). Also, the font designer has entered referenced values for the X and Y coordinates (key point 120 (code 0) and width values=16 (also code 0). The system retrieves the predefined formula that is associated with the designer entered referenced key point and width value. The formula is executed separately for the X and Y coordinates. The following formulas (1) and (2) are performed for feature point 124*a*, as shown in FIG. 4D. X is the x coordinate value and Y is the y coordinate value of designated feature point 124*a*. $X_{k\varnothing}$ is the x coordinate value and $Y_{k\varnothing}$ is the y coordinate value for key point 120 (code 0) and $W_\varnothing$ is the width value of width code 0.

$$X_{Ref}=(X-X_{k\varnothing})/W_\varnothing \quad (1)$$

$$Y_{Ref}=(Y-Y_{k\varnothing})/W_\varnothing \quad (2)$$

The next two formulas (3) and (4) are retrieved and executed according to the font designer referenced values for feature point 130, as shown in FIG. 4E.

$$X_{Ref}=(X-X_{k\varnothing})/(X_{k1}-X_{k\varnothing}) \quad (3)$$

$$Y_{Ref}=(Y-Y_{k\varnothing})/(Y_{k1}-Y_{k\varnothing}) \quad (4)$$

Note that formulas (3) and (4) do not use the width value in the calculation. This is because two different referenced key points are identified in boxes 126 of window 118, thus not requiring use of any width values for calculating x and y feature point reference values.

Figure 4H:
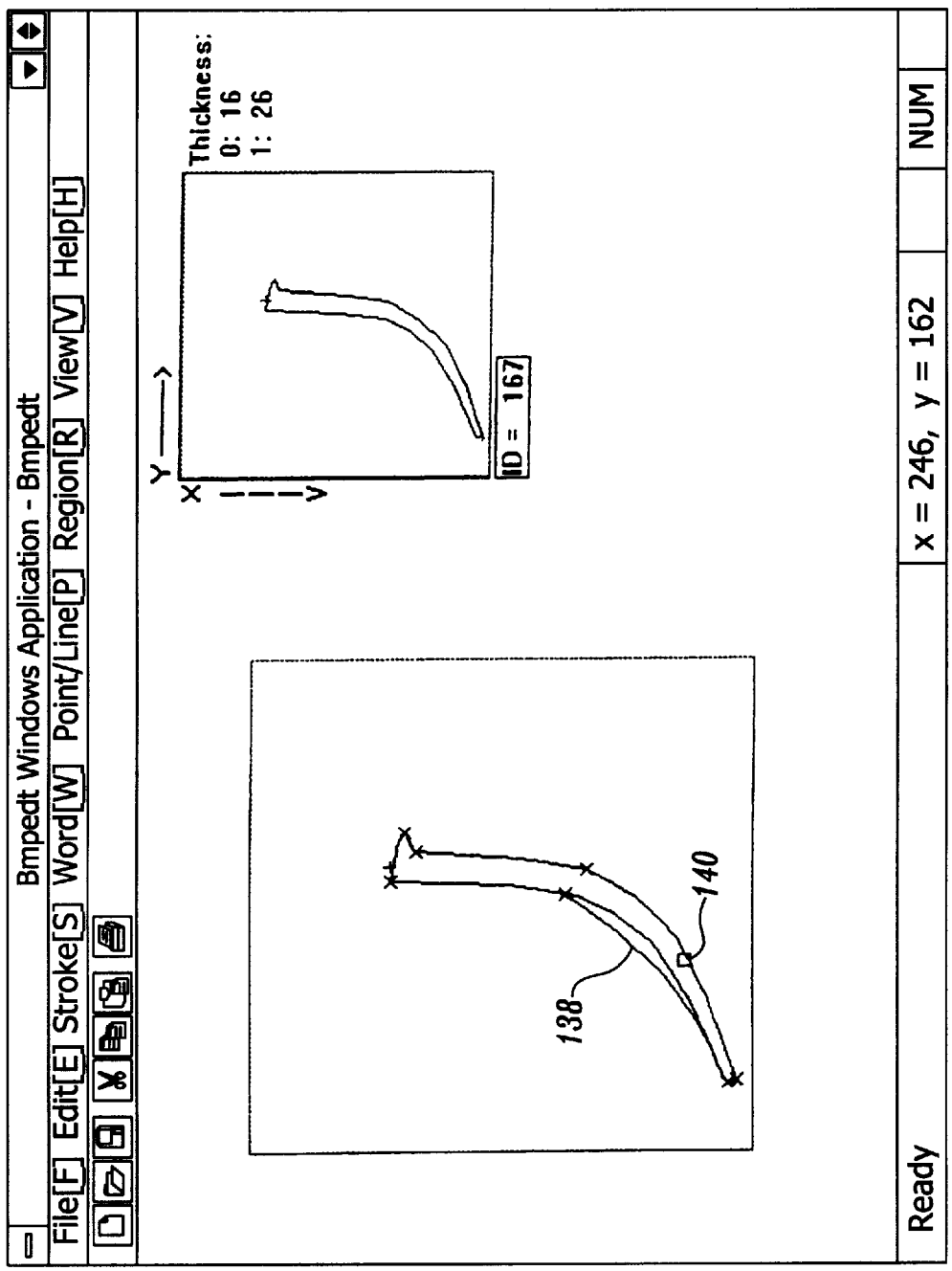
Figure 49:
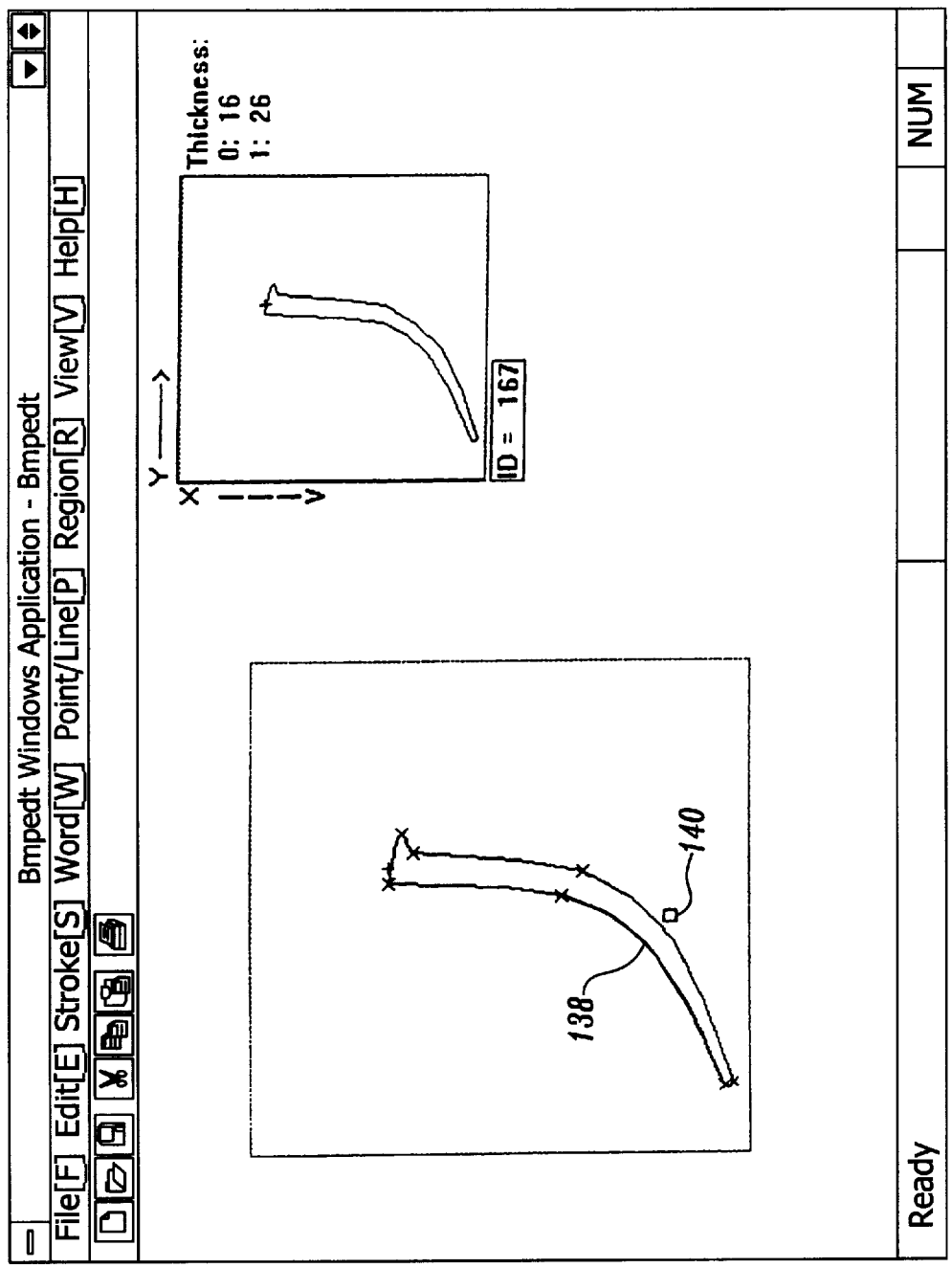
Figure 4F:
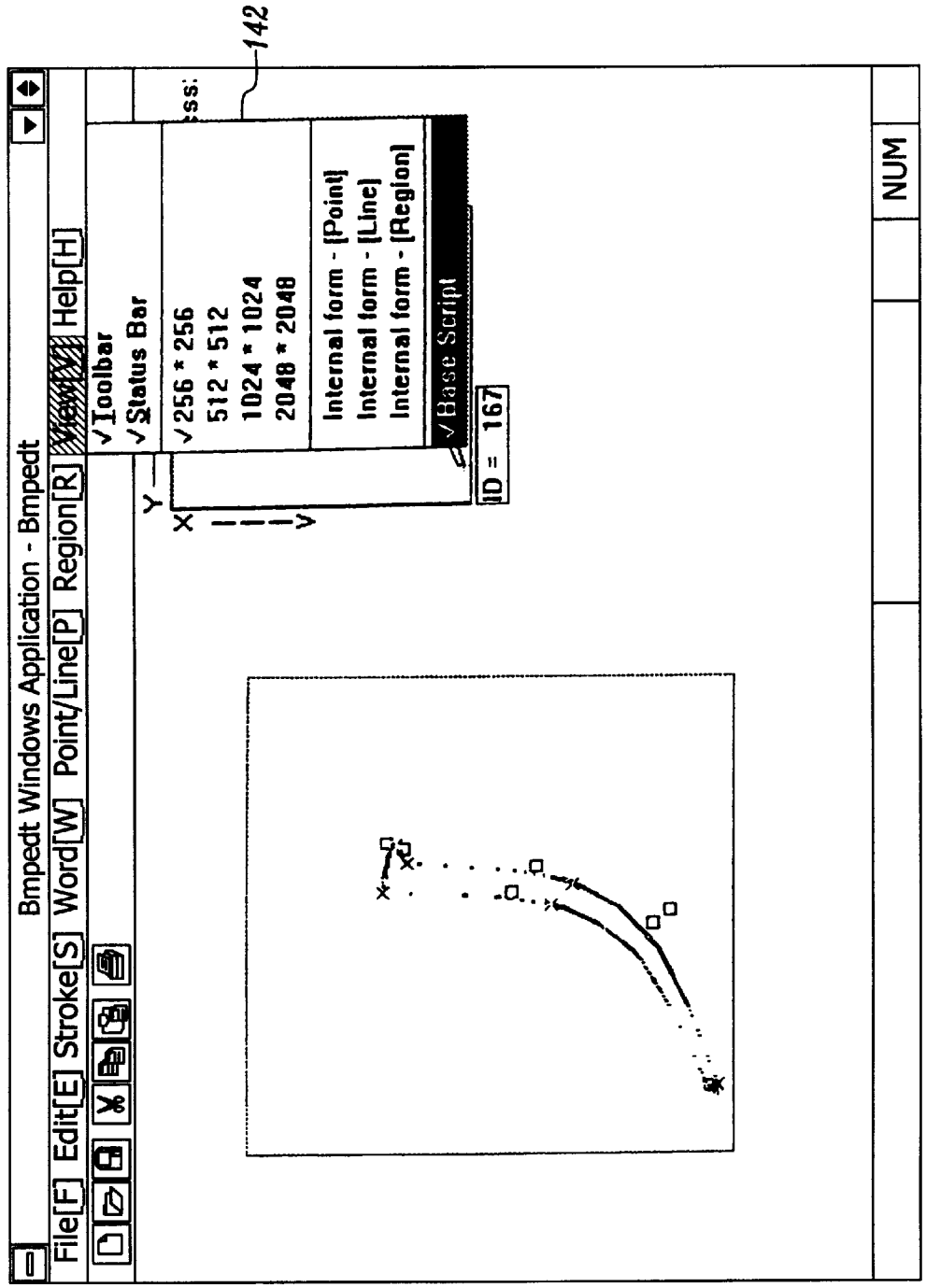

Once two consecutive feature points exist a curve segment can be generated between the feature points. Referring to FIG. 4F, the designer selects the Add Line command 136 from the menu bar to initiate line or curve generation, FIG. 4G. As shown in FIG. 4G, the designer selects a pair of consecutive feature points 137 and 139 and selects the Add Line command 136 that presents a line 138 connecting the selected feature points 137 and 139 and a movable midcontrol point 140 at the midpoint of line 138. The midcontrol point 140 is movable by the cursor controlling device to any position within space 108. As shown in FIG. 4H, a curve is generated when the midcontrol point 140 location is not co-located with a direct line connecting the two feature points 137 and 139. Curve generation is performed according to second order Bezier curve generation.

The following formulas are used by the processor for performing the curve generation described above:

if $X_{P1}=X_{P2}$ then $$X_R=X_{mid}-X_{P1};\quad(5)$$

if $X_{P1}\neq X_{P2}$ then $$X_R=(X_{mid}-(X_{P1}+X_{P2})/2)/|X_{P1}-X_{P2}|;\quad(6)$$

if $Y_{P1}=Y_{P2}$ then $$Y_R=Y_{mid}-Y_{P1};\quad(7)$$

if $Y_{P1}\neq Y_{P2}$ then $$Y_R=(Y_{mid}-(Y_{P1}+Y_{P2})/2)/|Y_{P1}-Y_{P2}|;\quad(8)$$

Figure 5:
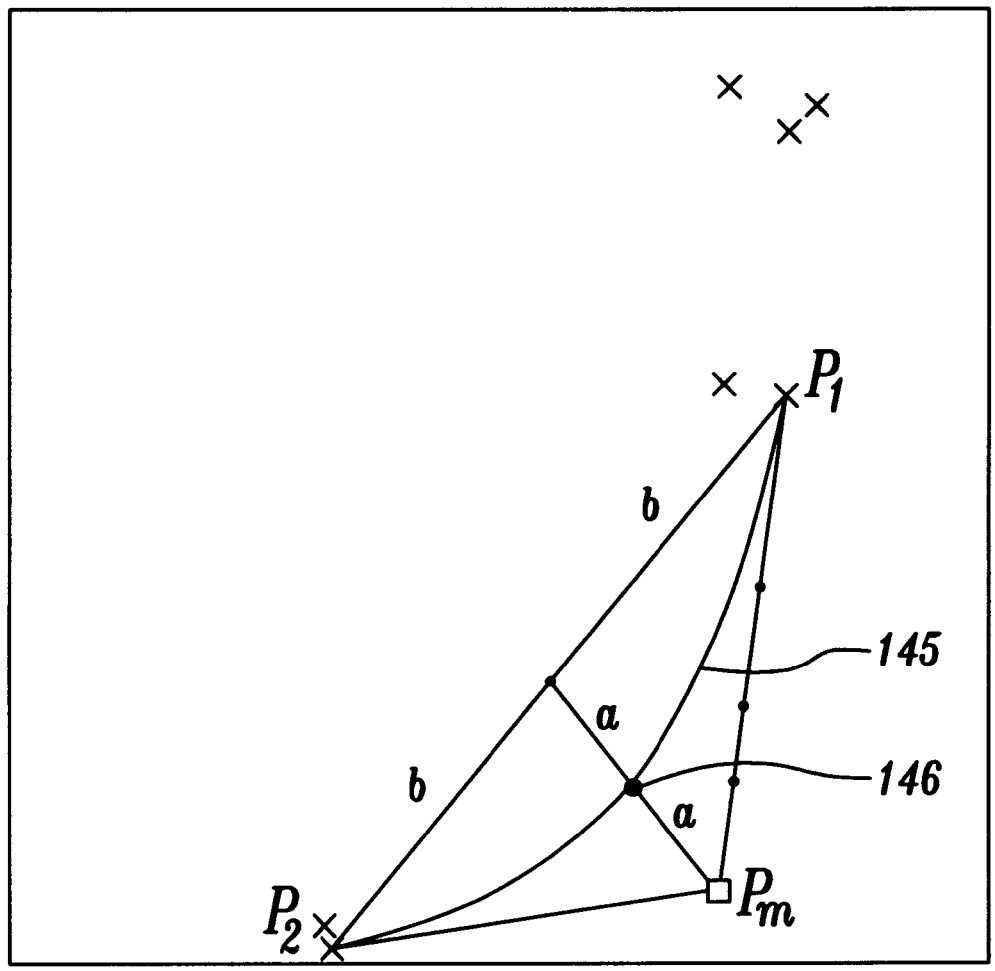
FIG. 5 is a geometric diagram illustrating curve generation geometry.

P1 is a first feature point, P2 is a second feature point, mid is the midcontrol point and R is a ratio value that is used for determining curve segments between feature points. FIG. 5 illustrates an example of the curve generation geometry generated using equations 5–8.

In FIG. 4I the midcontrol point 140 is positioned such that the generated curve segment matches the outline of the template basic stroke. In FIG. 4J, all the feature points and midcontrol points have been designated to adequately describe the outline of the basic stroke. The primary and secondary parameters are now assigned and stored for the basic stroke from the example shown in FIGS. 4A–4J. Also, a base resolution is assigned to the basic stroke as designated in a pull-down menu 142. Pull-down menu 142 presents selectable display and base script character space resolution options.

The strokes of a basic stroke are expressed by the following:

$$S=f_i(\{K_j\},\{W_k\})\quad(9)$$

where S is stroke, i is ith or the basic stroke code i of the basic stroke, $f_i$ is the feature point reference formula corresponding to the basic stroke code i, $K_j$ is the key point j, and $W_k$ is the kth referenced width. The formula $f_i$ is an algorithm which accepts the input data of key point locations $|\{K_j\}|$ and referenced width values $|\{W_k\}|$ to generate the outline. As such, stroke data of a font is stored in the form of the mathematical expression Equation 9 above.

User CAD Tool

Figure 6A:
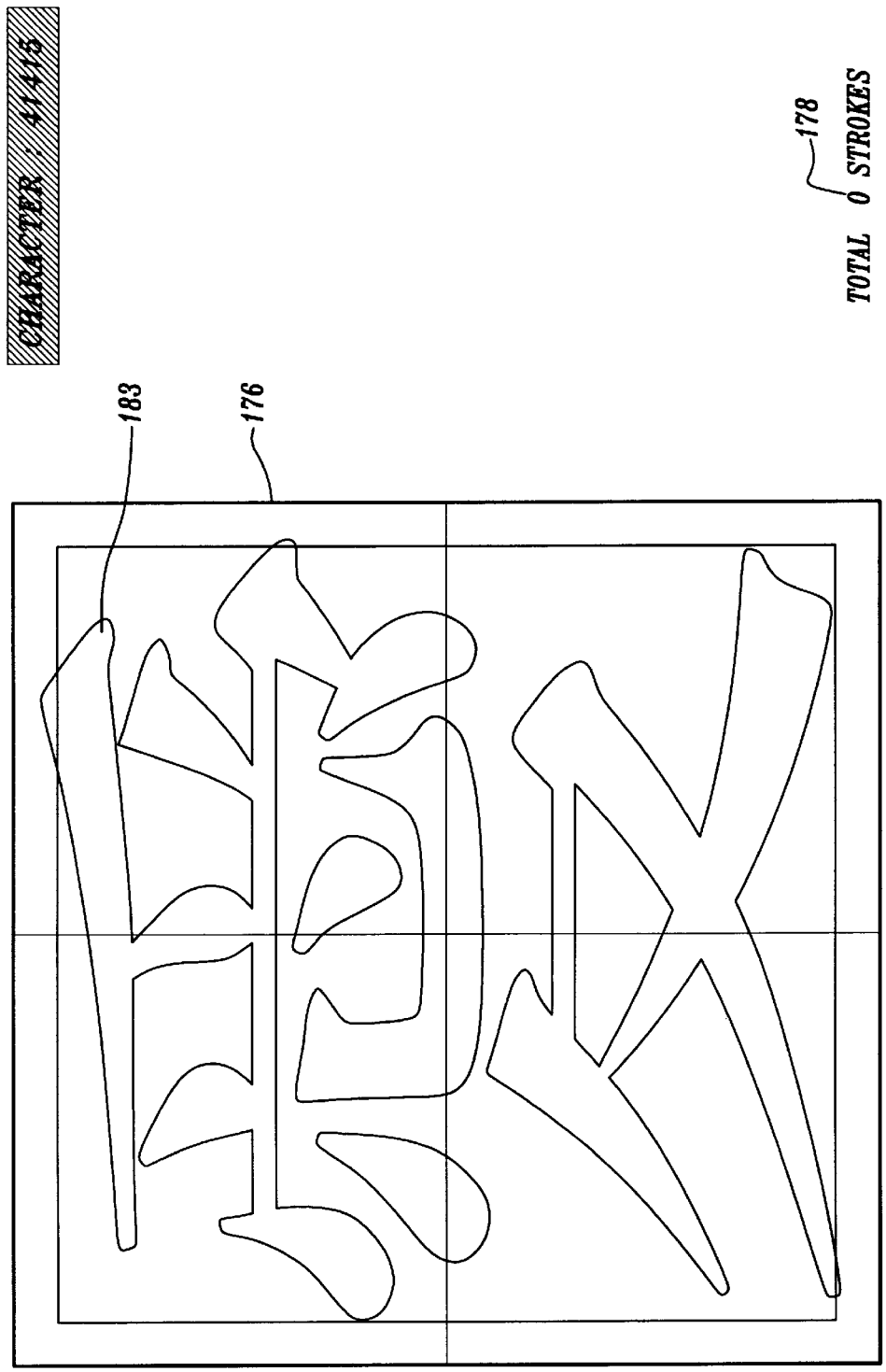
Figure 6B:
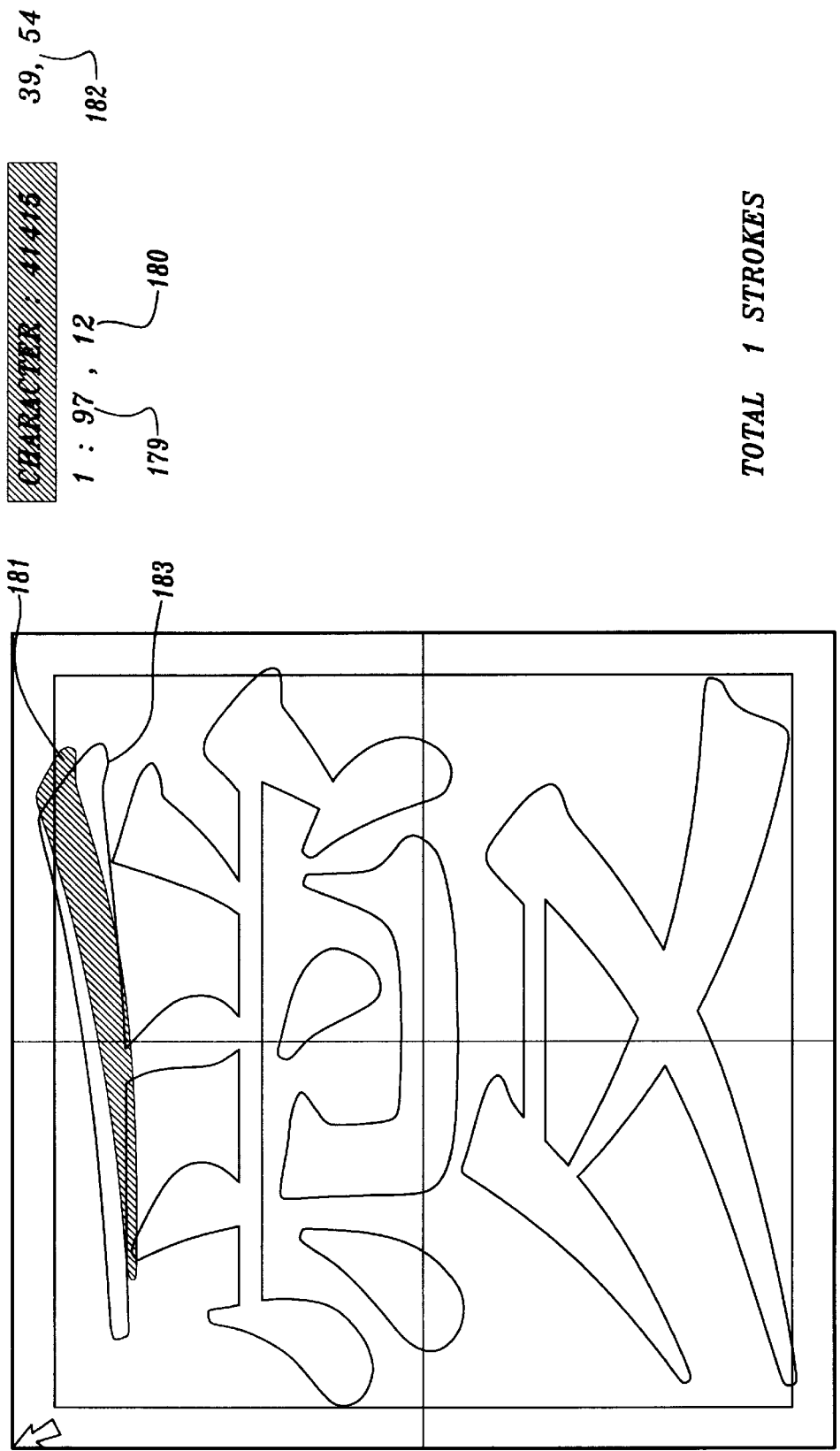
Figure 66:
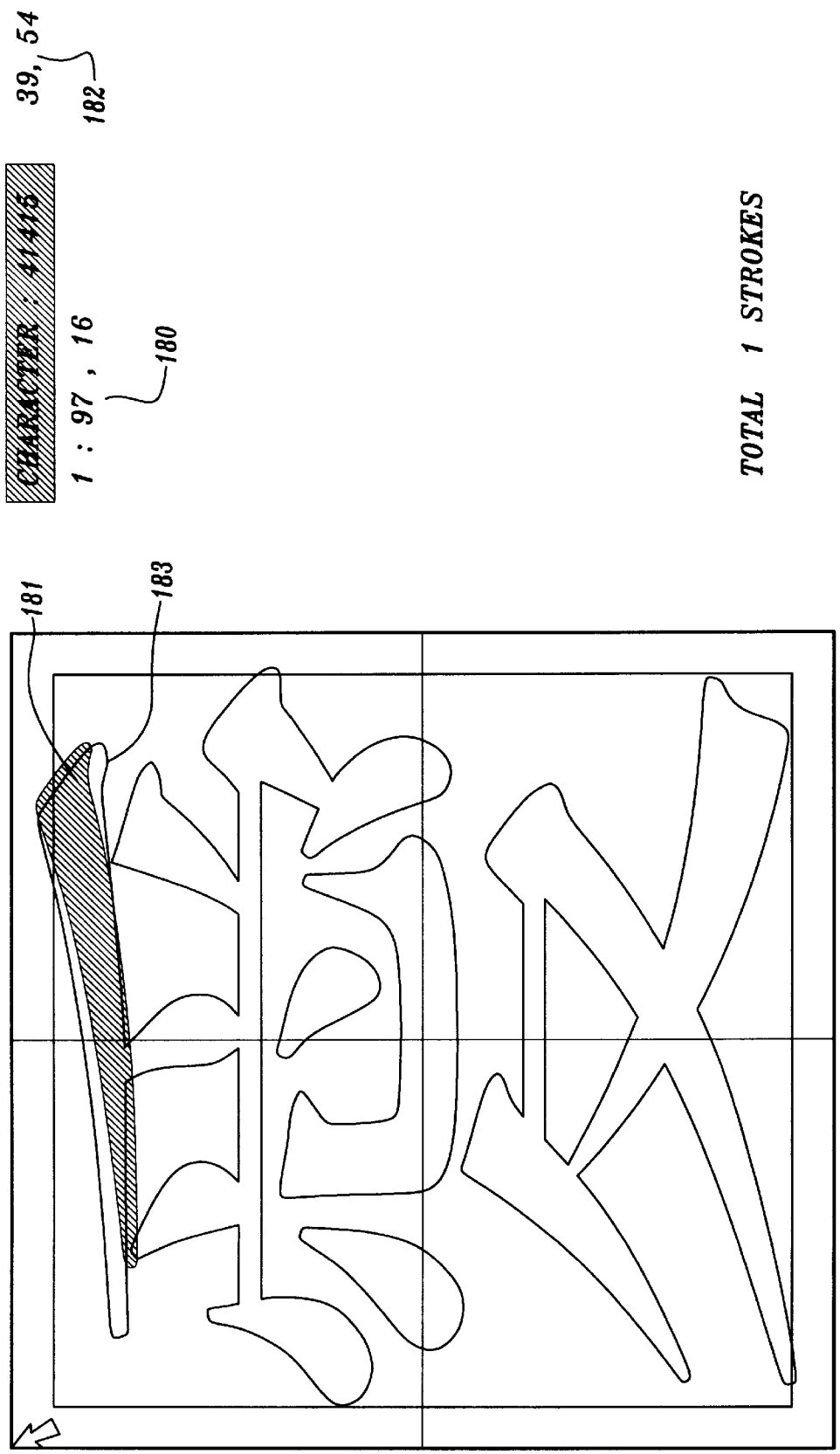
Figure 6D:
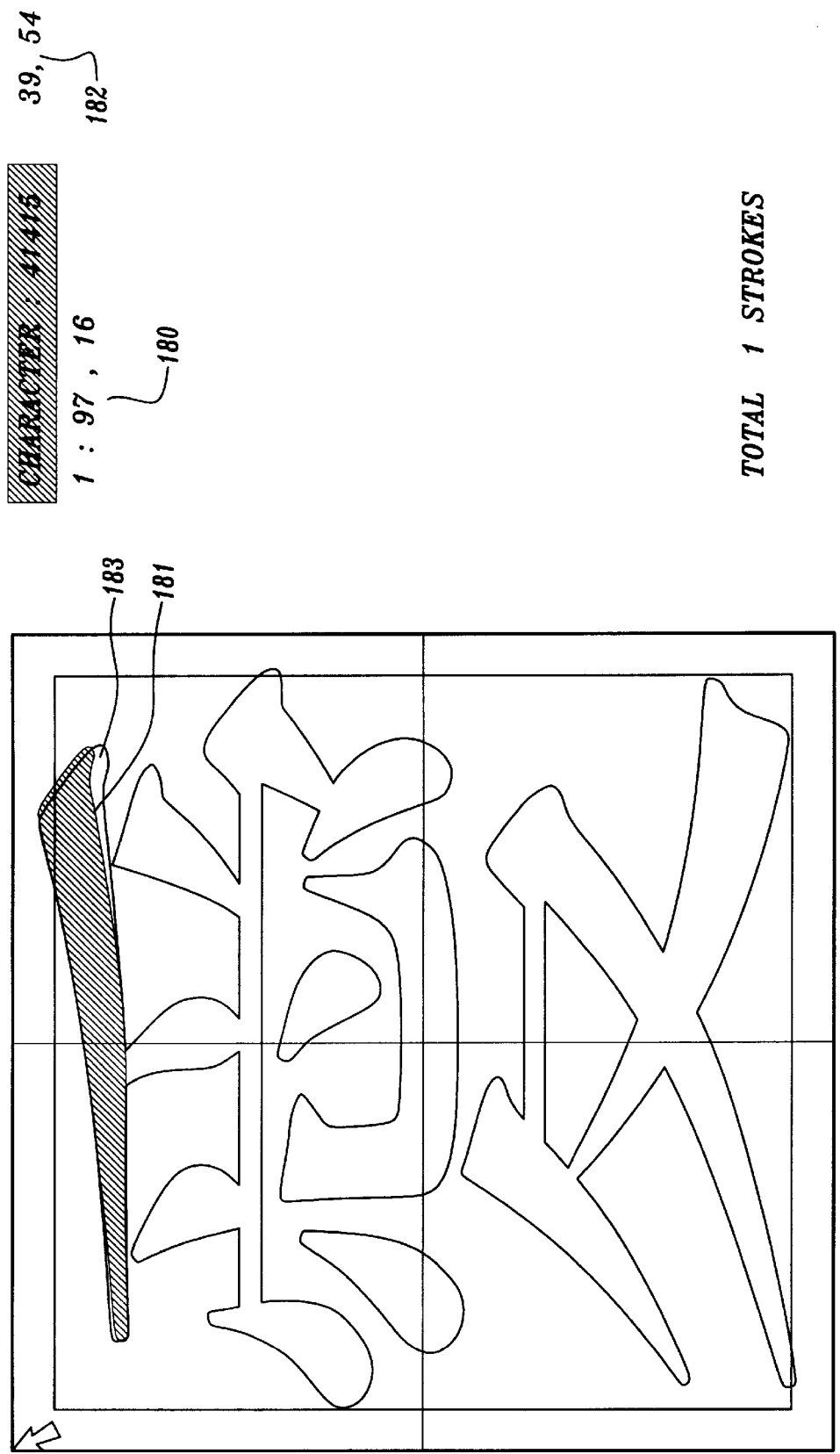
Figure 68:
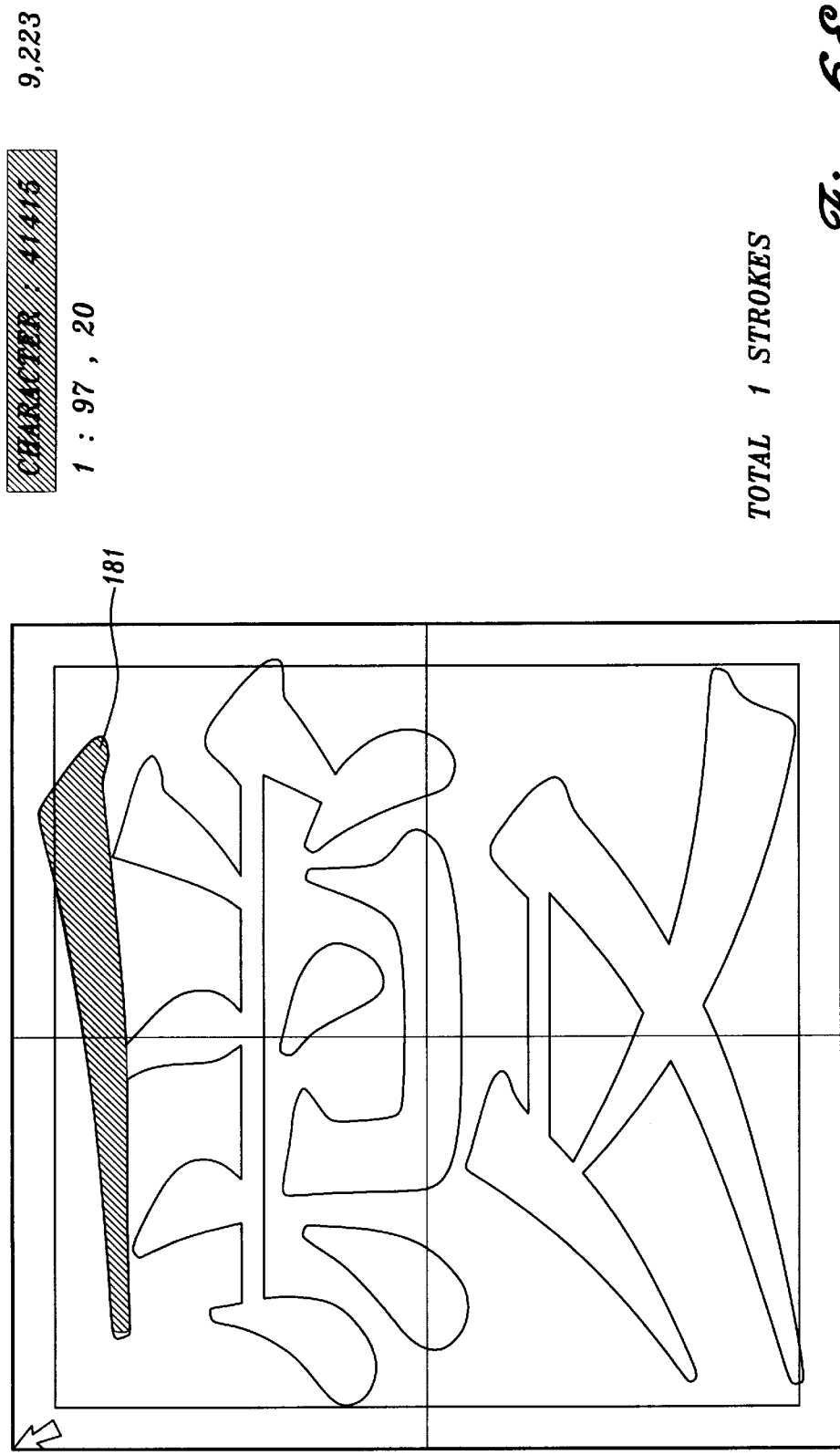

FIGS. 6A–6E illustrate a user CAD tool for performing the user font generation method described in FIG. 2D above. The user CAD tool is also a windows-based graphical user interface that includes a workspace with a character display area 176. First, the user selects a character of a font that the user desires to use as a template for creating a stored set of strokes. The selected character is displayed in the character display area 176. Also, within the workspace the CAD tool displays the number of strokes saved, at space 148, and the stroke number the user is presently working on, at area 177. Second, the user assigns a previously generated basic stroke to each of the strokes of the selected character. The user selects a basic stroke that most closely resembles each stroke in the selected character. For example, as shown in FIG. 6B, the user has selected the basic stroke 181 (code number 97) to match the top horizontal stroke 183 of the displayed character. The selected basic stroke 181 is displayed within character display area 176. After basic stroke selection, the changes the shape of the basic stroke to match the stroke of the character moving the basic stroke's key points. For example, as shown in FIGS. 6C and 6D, the user has changed the key point locations of the basic stroke 181 to better match that of the outline stroke. The secondary parameters are moved and displayed in real-time according to relative key point's position. The left most key point has been moved from location (39, 54) to (37, 35). Key point movement can be performed by the use of a user controlled cursor or by directly entering new coordinate locations for the key points.

FIGS. 6B–6E illustrate an example of the user increasing the basic stroke's width value for the basic stroke 181 to more closely match the stroke 183. In FIG. 6C, the user has increased the width value to 16 from an original 12 and further increases the width value to 20, as shown in FIG. 6E, thus matching the basic stroke 181 to the stroke of the selected character. In FIG. 6E, basic stroke 181 matches the stroke 183. The newly created basic stroke 181 is now saved in memory for later use in stroke generation. The user font generation CAD tool is designed for use in a windows-based operating system, however, it can also be implemented in various other types of operating systems. It is also noted, that the method performed by the user font generation CAD tool could be performed automatically using image analysis techniques. Also performed within the user font generation CAD tool is the method of hinting, described below. Hinting could also be performed in the basic stroke CAD tool.

Hinting

A font designer or user assigns hints to key points to increase the display quality of strokes of the constructed font in low resolution space. Hint information modifies stroke shapes to avoid jammed strokes and maintains symmetry of strokes in the viewing space during character rendering. In order to assign hint information, the font designer or user simply labels which key point(s) of a stroke, such as that shown in FIG. 6E, requires hinting.

Figure 7A:
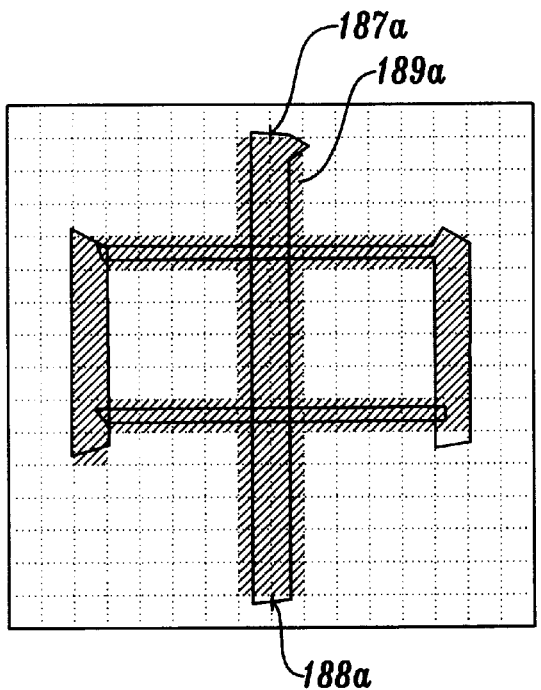
FIGS. 7A and 7B are illustrations of a bitmap character with unlabeling and labeling key points, respectively.
Figure 7B:
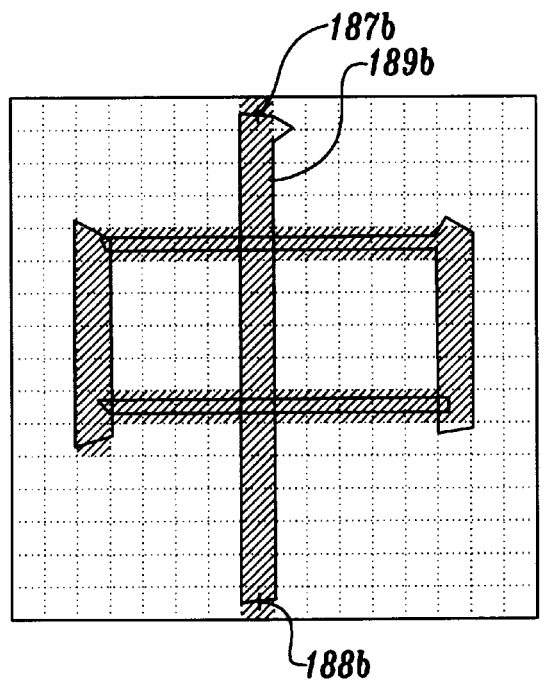

Hint information is used during the display of key points. A key point with hint information is moved to the center of the display cell (pixel) in which it appears. FIGS. 7A and 7B illustrate the contrast of unlabeled and labeled key points. In FIG. 7A, key points 187a and 188a are unlabeled. Thus, the outline of stroke 189a activates two columns of display cells in the low resolution space, because the outline covers at least 50% of display cells of two columns.

In contrast, as shown in FIG. 7B, key points 187b and 188b are labeled and the key points are moved to the center of the display cell. Thus, stroke 189b maintains a stroke width of one display cell, because the key points 187b and 188b are moved to the center of display cells of the same display cell column. The outline of stroke 189b activates only one column of pixels.

FIG. 8 shows an illustration of the stored data of the font identifier 410 of a "Ming-type" font created in the CAD tool. The starred symbols 191 indicate that the associated key points are labeled with hint information. Column 192 is a list of feature points represented by codes. Column 193 is a list of referenced key points with X and Y coordinates. Column 194 is a list of coded width values. Column 195 is a list of referenced relative positions for determining feature point positions relative to key point locations. The relative position values in column 195 are determined by the predefined formulas for calculating relative coordinate positions, for example see Equations 1–4. Column 196 is a list of curve segments represented in codes. Column 197 lists pairs of two feature points for each curve segment. Column 198 is a list of ratios for determining the midcontrol points. The midcontrol point ratios of column 198 are calculated from Equations 5–8. Column 199 is a list of stroke areas represented in codes, and finally, Column 200 indicates the feature points which form the area vertices.

The stored key point locations show at the top of FIG. 8 are stored in accordance with a predetermined resolution value. In the example of FIG. 8 the key point location shown is stored relative to a 256×256 character space. If the character 410 is displayed in a character space other than a 256×256 character space, a proportional calculation is performed to maintain key point positions within the character space.

Character Rendering

The font generation technique is essentially the reverse process of the font creation techniques. The first step centers each labeled key point with hint information in the dot matrix grid (pixel) that it is addressed to. If a key point is not labeled with hint information, the key point location is unchanged in the display character space. Then, the feature points are calculated according to the generated and stored values relative to the location of the key points and width values. Curve segments between the calculated feature points are calculated according to the generated and stored midcontrol points or midcontrol point ratios. The curve segments join to form the outline of the strokes. Finally, a filling technique fills the area within the stroke outline. The filling technique activates a pixel according to predefined criteria. In the present invention a pixel is activated on the output device if at least half of the pixel is covered by the area within the calculated stroke outline or the center of the pixel is within the calculated stroke outline. In order to save processing time, a commonly known filing technique uses a predetermined number of cords to represent curve segments of various radii for activating pixels Other type of filling techniques may be used to accomplish efficient generation of the characters.

Figure 9C:
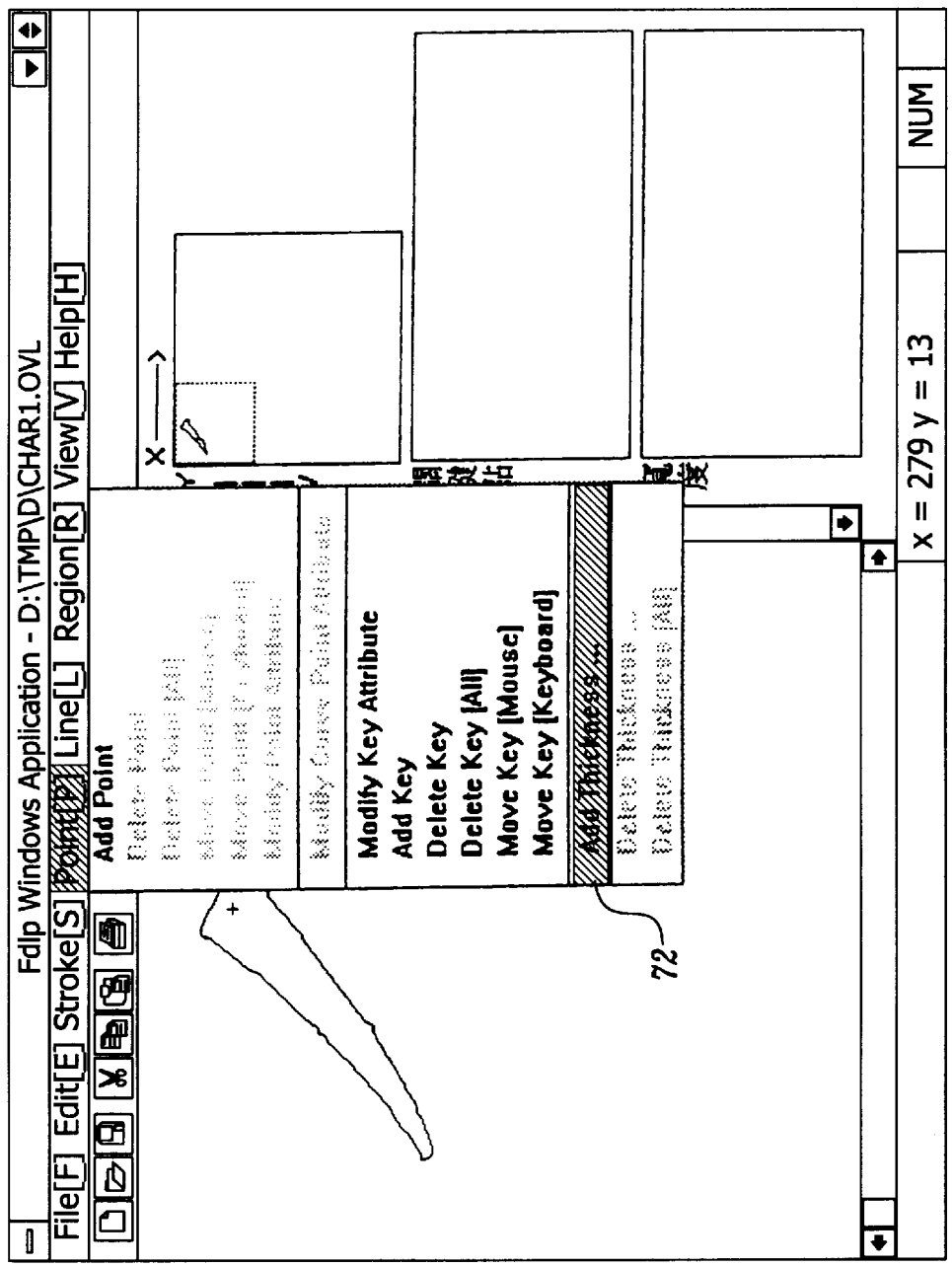
FIG. 9 is a low resolution display of Asian characters generated by this invention.
Figure 9:
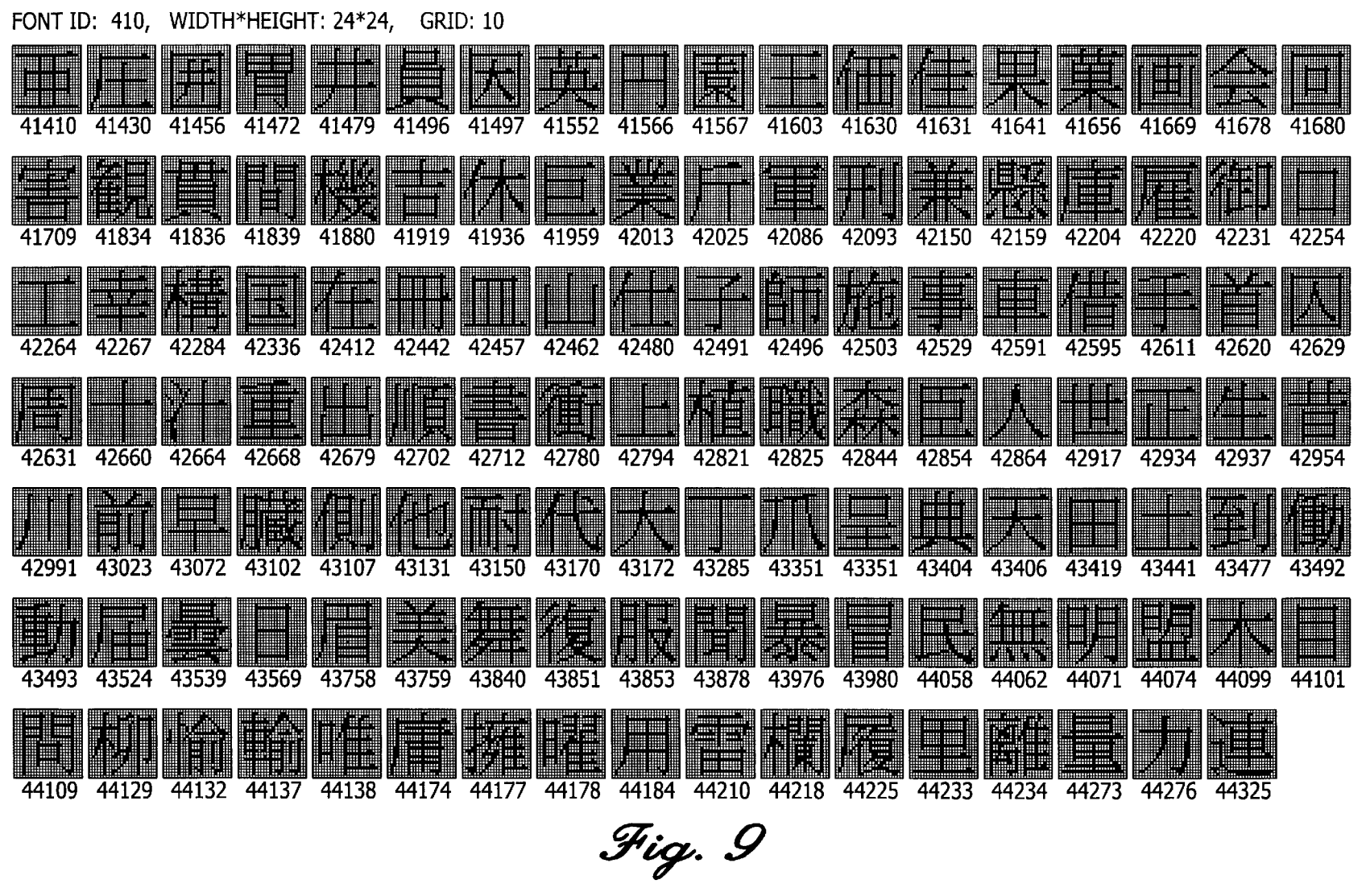

FIG. 9 shows the output result of sample characters of a "Ming-type" font in a 24×24, low resolution, single character bitmap produced by the method of this invention.

While the preferred embodiment of the invention has been illustrated and described, it will be apparent that various changes can be made therein without departing from the spirit and scope of the invention.

The embodiments of the invention in which an exclusive property or privilege is claimed are defined as follow:

1. A character generating method for generating character bitmap images of a particular font for display on an output device, wherein each generated character comprises a plurality of strokes, said method comprising the steps of:
   (a) selecting a character for display on the output device, wherein each stroke comprises predefined, prestored key points that are adapted to be selectively and individually moved to change the outline of said stroke, width values that are adapted to be selectively varied to change the outline of said stroke, curve values, and feature points that have a predefined spatial relationship to the key points and wherein a key point is labeled with hint information if the key point requires a predefined specific display location;
   (b) calculating non-labeled key points that are associated with the strokes of said selected character in the character bitmap space on the output device at the key points' prestored positions;
   (c) calculating labeled key points that are associated with the strokes of said selected character in the character bitmap space at the center of the bitmap cell that contains the labeled key point according to the key point's prestored position; and
   (d) rendering the strokes of the selected character in the character bitmap space on the output device according to the width values, curve values, feature points of the strokes, and calculated labeled and non-labeled key points.

2. The character generating method of claim 1, wherein step (d) further comprises the steps of:
   i) calculating feature points according to the predefined spatial relationship with the placed labeled key points and the unlabeled key points;
   ii) calculating curve segments between consecutive calculated feature points according to the curve values;
   iii) calculating outlines for strokes by connecting the calculated curve segments; and
   iv) activating pixels on the output device if at least half of the pixel is covered by the area within the calculated stroke outline or the center of a pixel is within the calculated stroke outline.

3. The character generating method of claim 2, wherein step (d.ii) further comprises the steps of:
   defining at least one midcontrol point existing between two consecutive feature points; and
   calculating said curve segments using Bezier triangle curve generation according to the defined at least one midcontrol point and the corresponding feature points.

4. A character generating apparatus for generating character bitmap images of a particular font for display on an output device, wherein each generated character comprises a plurality of strokes, said apparatus comprising:
   means for selecting a character for display on the output device; wherein each stroke comprises predefined, prestored key points that are adapted to be selectively and individually moved to change the outline of said stroke, width values that are adapted to be selectively varied to change the outline of said stroke, curve values, and feature points that have a predefined spatial relationship to the key points and wherein a key point is labeled with hint information if the key point requires a predefined specific display location;
   means for fixing non-labeled key points that are associated with the strokes of said selected character in the character bitmap space on the output device at the key points' prestored positions;
   means for fixing labeled key points that are associated with the strokes of said selected character in the character bitmap space at the center of the bitmap cell that contains the labeled key point according to the key point's prestored position; and
   means for rendering the strokes of the selected character in the character bitmap space on the output device according to the width values, curve values, feature points of the strokes and fixed labeled and non-labeled key points.

5. The character generating apparatus of claim 4, wherein means for generating a bitmap image further comprises:
   means for calculating feature points according to the predefined spatial relationship with the placed labeled key points and the unlabeled key points;
   means for calculating curve segments between consecutive calculated feature points according to the curve values;
   means for calculating outlines for strokes by connecting the calculated curve segments; and means for activating pixels on the output device if at least half of the pixel is covered by the area within the calculated stroke outline or the center of a pixel is within the calculated stroke outline.

6. The character generating apparatus of claim 5, wherein said means for calculating outlines further comprises:

means for defining at least one midcontrol point existing between two consecutive feature points; and means for calculating said curve segments by using Bezier triangle curve generation according to the defined at least one midcontrol point and the corresponding feature points.

7. A computer graphical user interface tool for generating stroke-based fonts using stroke representation and stroke shape bitmap generation for displaying stroke-based fonts in a bitmap space, said interface tool including an output device, processor, and memory, said graphical user interface comprising:

means for observing a set of master characters;

means for generating a set of basic strokes from the observed set of master characters, wherein each basic stroke in the generated set of basic strokes includes key points that are adapted to be selectively and individually moved to change the outline of said stroke and width values that are adapted to be selectively varied to change the outline of said stroke;

means for identifying and labeling key points of basic strokes that must be displayed at the center of a bitmap cell when displayed in a bitmap space on the output device; and means for storing said generated basic strokes with labeled and unlabeled key points in said memory.

8. The computer graphical user interface tool of claim 7, wherein said means for generating a set of basic strokes further comprises:

means for defining a stroke shape formula for each basic stroke;

means for defining feature points according to said defined stroke shape formula;

means for defining curve segments between said defined feature points; and means for storing the defined stroke shape formula, feature points and curve segments in said memory.

9. The computer graphical user interface tool of claim 8, wherein the means for defining curve segments comprises:

means for defining at least one midcontrol point for each pair of feature points; and a curve generator for calculating Bezier curve segments according the at least one midcontrol point and the associated pair of feature points.

10. A method for generating a font of an Asian language, said Asian language including a set of characters, said method comprising the steps of:

generating a set of basic strokes based upon observing said set of characters, each said basic stroke in said set of basic strokes being representative of a set of similar strokes used in said set of characters, each said basic stroke identified by a plurality of key points that are adapted to be selectively and individually moved to change the outline of said stroke and at least one width value that is adapted to be selectively varied to change the outline of said stroke;

using said set of basic strokes to build stroke by stroke each of said characters in said set of characters by:

(i) for each stroke in each character, identifying said basic stroke in said set of basic strokes that most closely approximates the stroke;

(ii) formulating a modified basic stroke having modified key points and modified width values by manipulating said basic stroke via said key points and width values to match said stroke;

(iii) storing said modified key points and modified width values in a memory; and (iv) repeating steps (i)–(iii) for each stroke of each character until all of the characters are represented by a plurality of modified basic strokes.

11. A method of displaying the characters of said font generated by the method of claim 10 in a low resolution space, said method including the step of:

for each modified basic stroke of each character to be displayed, centering each predetermined modified key point in each pixel that it is addressed to.

12. A computer readable medium containing a font of a set of characters, said font generated by:

generating a set of basic strokes based upon observing said set of characters, each said basic stroke in said set of basic strokes being representative of a set of similar strokes used in said set of characters, each said basic stroke identified by a plurality of key points that are adapted to be selectively and individually moved to change the outline of said stroke and at least one width value that is adapted to be selectively varied to change the outline of said stroke;

using said set of basic strokes to build stroke by stroke each of said characters in said set of characters by:

(i) for each stroke in each character, identifying said basic stroke in said set of basic strokes that most closely approximates the stroke;

(ii) formulating a modified basic stroke having modified key points and modified width values by manipulating said basic stroke via said key points and width values to match said stroke;

(iii) storing said modified key points and modified width values in a memory; and (iv) repeating steps (i)–(iii) for each stroke of each character until all of the characters are represented by a plurality of modified basic strokes.

13. A computer readable medium having computer-executable instructions for generating character bitmap images of a particular font for display on an output device, wherein each generated character comprises a plurality of strokes, said instructions when loaded into a computer causing the computer to execute the steps of:

(a) selecting a character for display on the output device, wherein each stroke of the character comprises predefined, prestored key points that are adapted to be selectively and individually moved to change the outline of said stroke, width values that are adapted to be selectively varied to change the outline of said stroke, curve values, and feature points that have a predefined spatial relationship to the key points and wherein a key point is labeled with hint information if the key point requires a predefined specific display location;

(b) calculating non-labeled key points that are associated with the strokes of said selected character in the character bitmap space on the output device at the key points' prestored positions;

(c) calculating labeled key points that are associated with the strokes of said selected character in the character bitmap space at an optimum position relative to the bitmap cell that contains the labeled key point according to the key point's prestored position; and (d) rendering the strokes of the selected character in the character bitmap space on the output device according to the width values, curve values, feature points of the strokes and calculated labeled and non-labeled key points.

14. The computer readable medium of claim 13, wherein (d) further comprises:
  i) calculating feature points according to the predefined spatial relationship with the placed labeled key points and the unlabeled key points;
  ii) calculating curve segments between consecutive calculated feature points according to the curve values;
  iii) calculating outlines for strokes by connecting the calculated curve segments; and
  iv) activating pixels on the output device if at least half of the pixel is covered by the area within the calculated stroke outline or the center of a pixel is within the calculated stroke outline.

15. The computer readable medium of claim 14, wherein (d.ii) further comprises:
  defining at least one midcontrol point existing between two consecutive feature points; and
  calculating said curve segments using Bezier triangle curve generation according to the defined at least one midcontrol point and the corresponding feature points.

* * * * *